Dec. 8, 1964  T. E. ROBERTS, JR., ETAL  3,160,320
WEIGHT CHECKING AND CORRECTING APPARATUS CONTROL
Original Filed Jan. 26, 1959  8 Sheets-Sheet 1
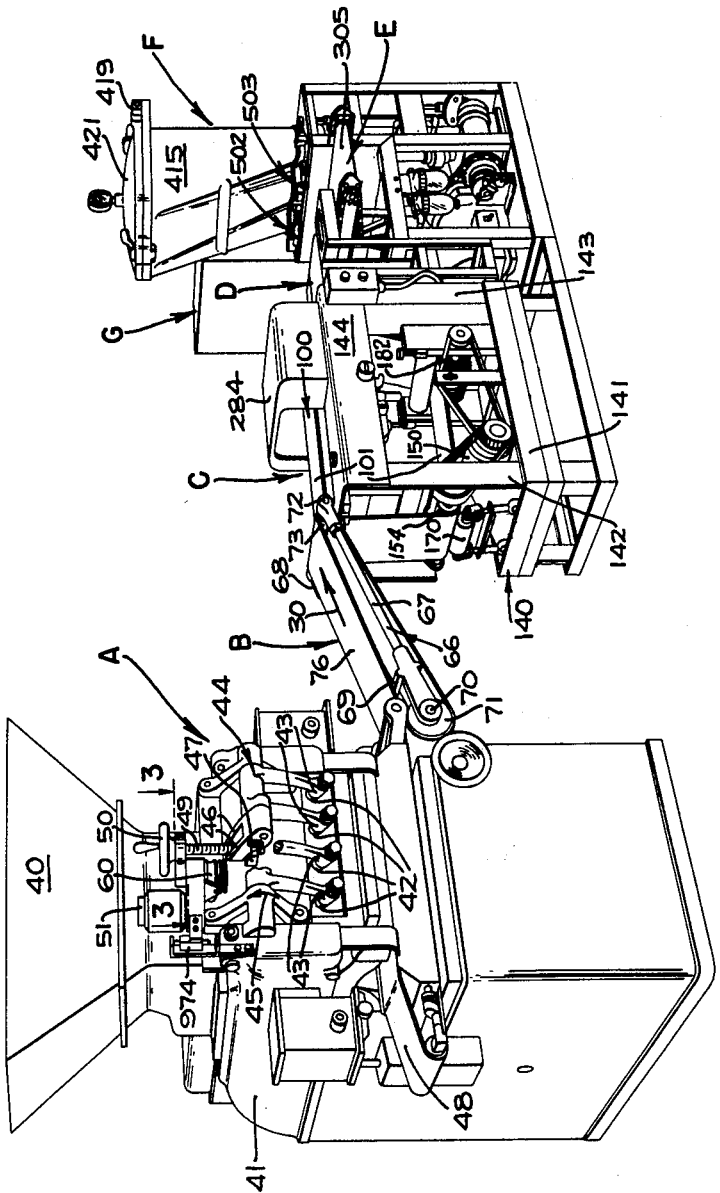
INVENTORS
THOMAS E. ROBERTS JR.
HERBERT B. BROOKS
WILLIAM J. FOWLER
BY
ATTORNEY Dec. 8, 1964     T. E. ROBERTS, JR., ET AL     3,160,320
WEIGHT CHECKING AND CORRECTING APPARATUS CONTROL
Original Filed Jan. 26, 1959                       8 Sheets-Sheet 2
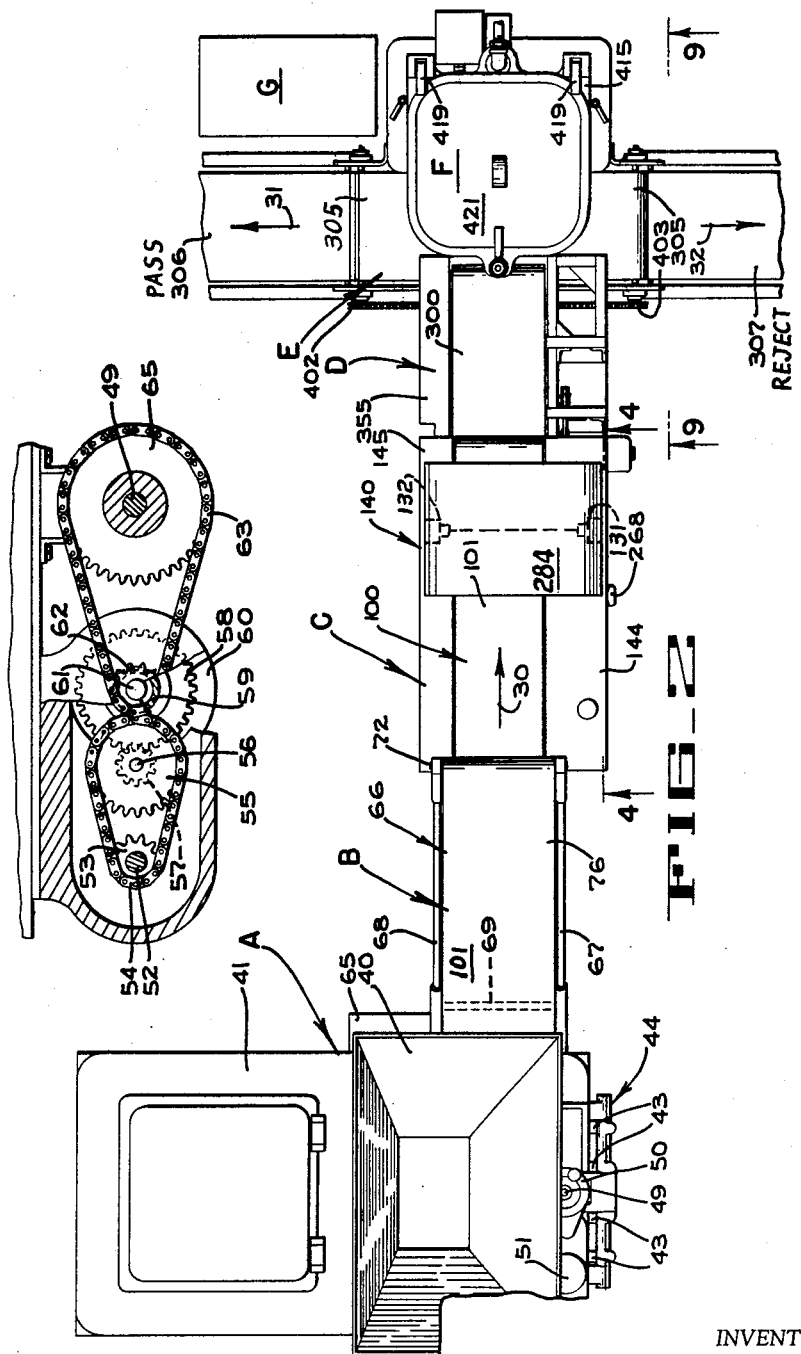
*INVENTORS*
THOMAS E. ROBERTS, JR.
HERBERT B. BROOKS
WILLIAM J. FOWLER
BY    *Hans G. Hofmeister*
                     ATTORNEY

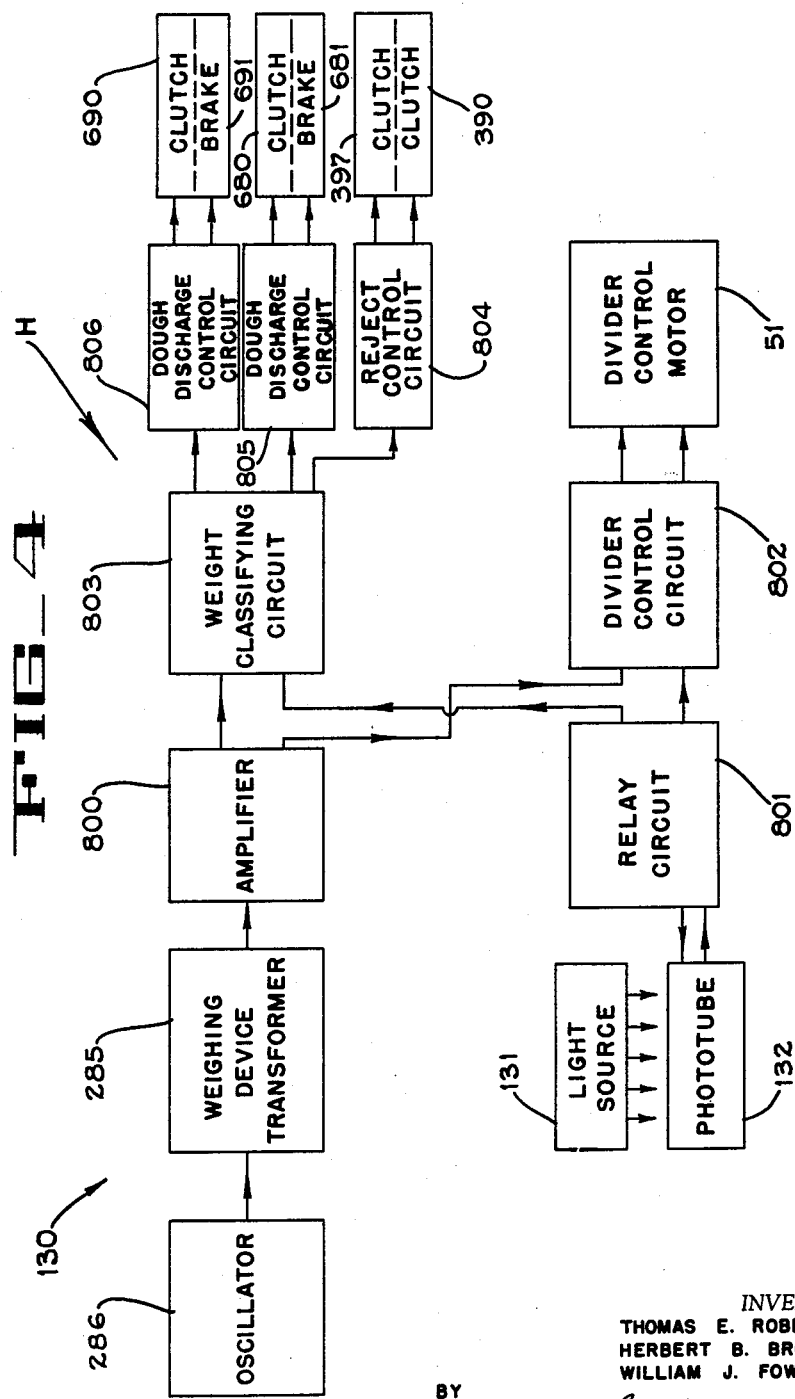

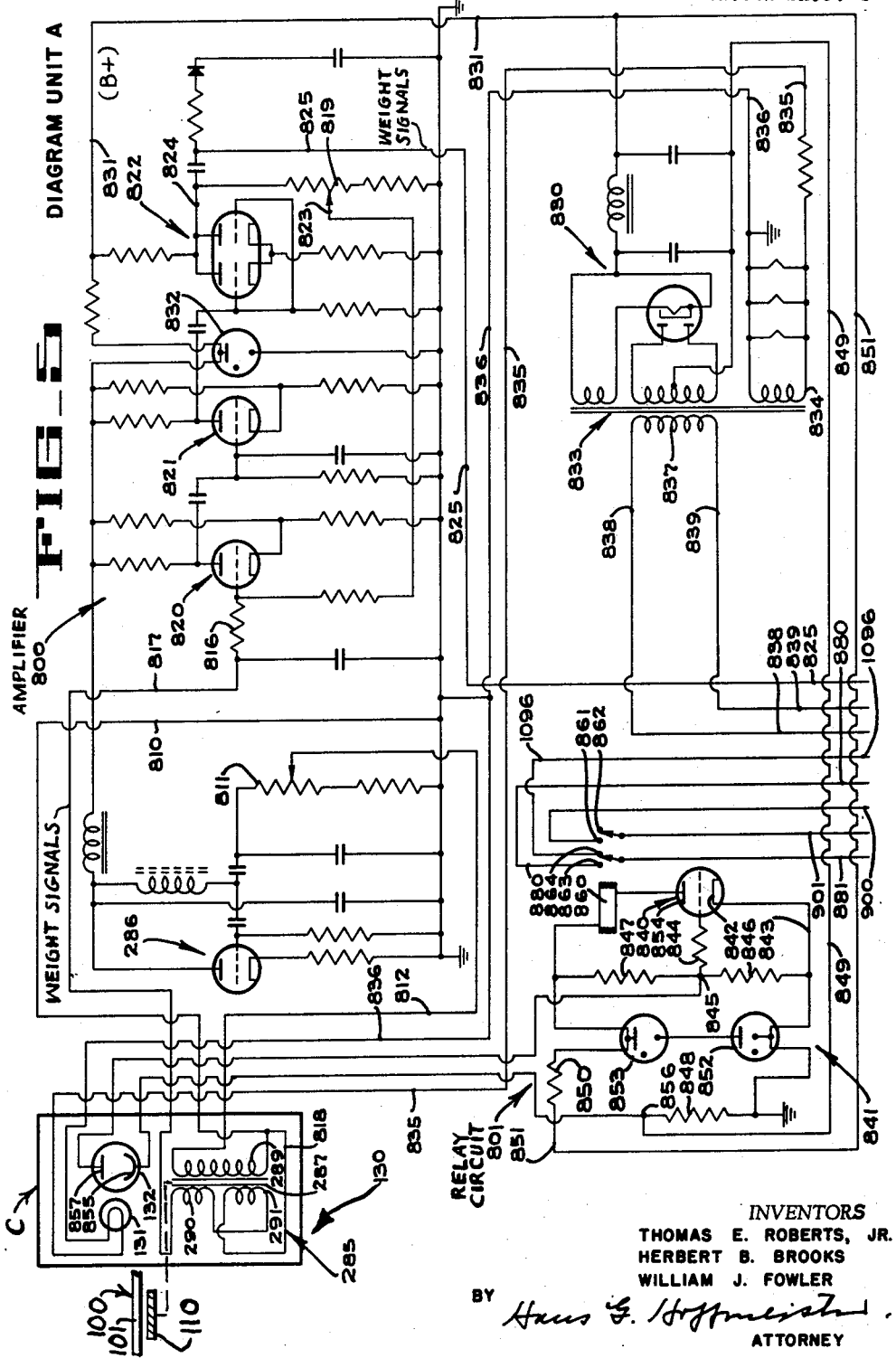

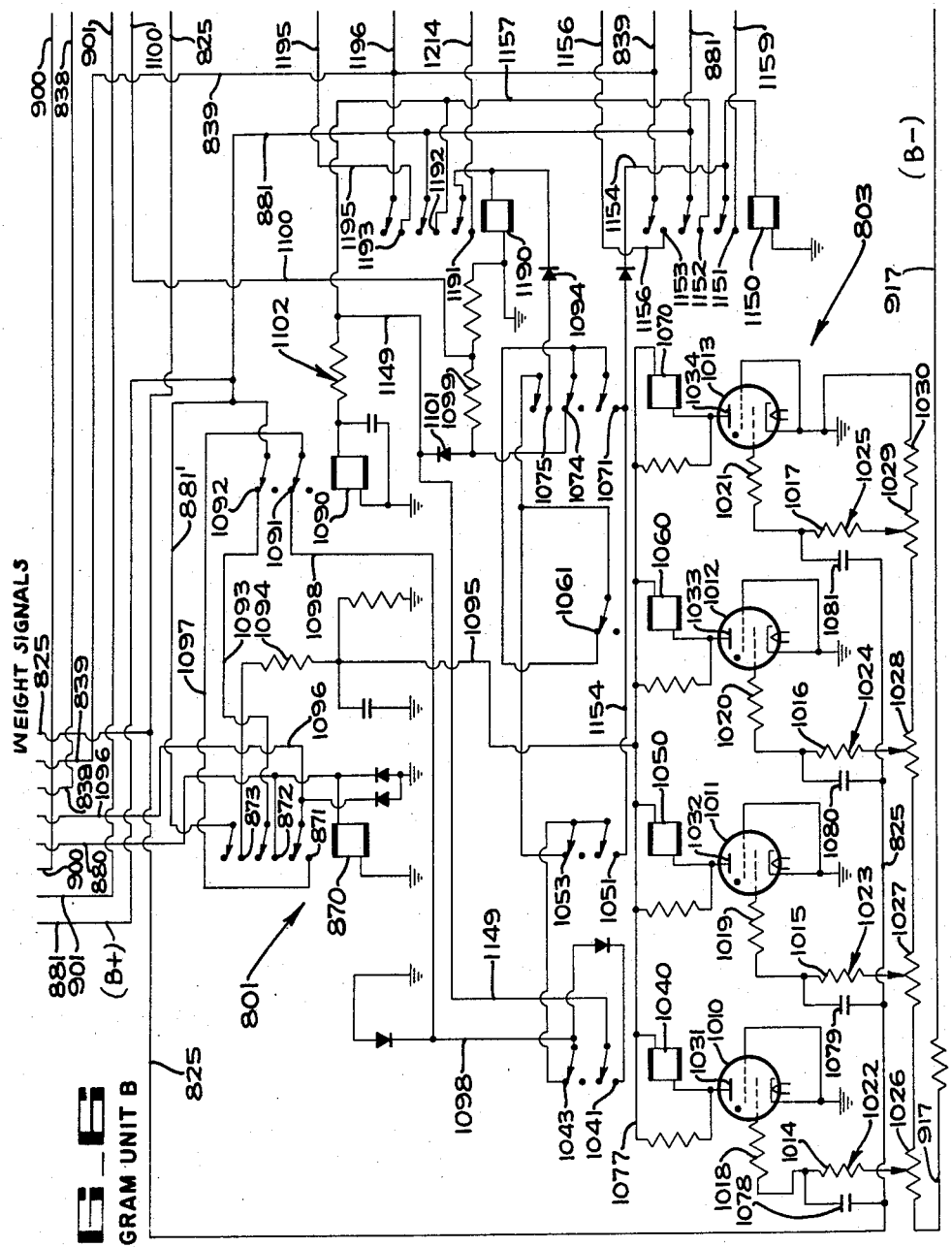

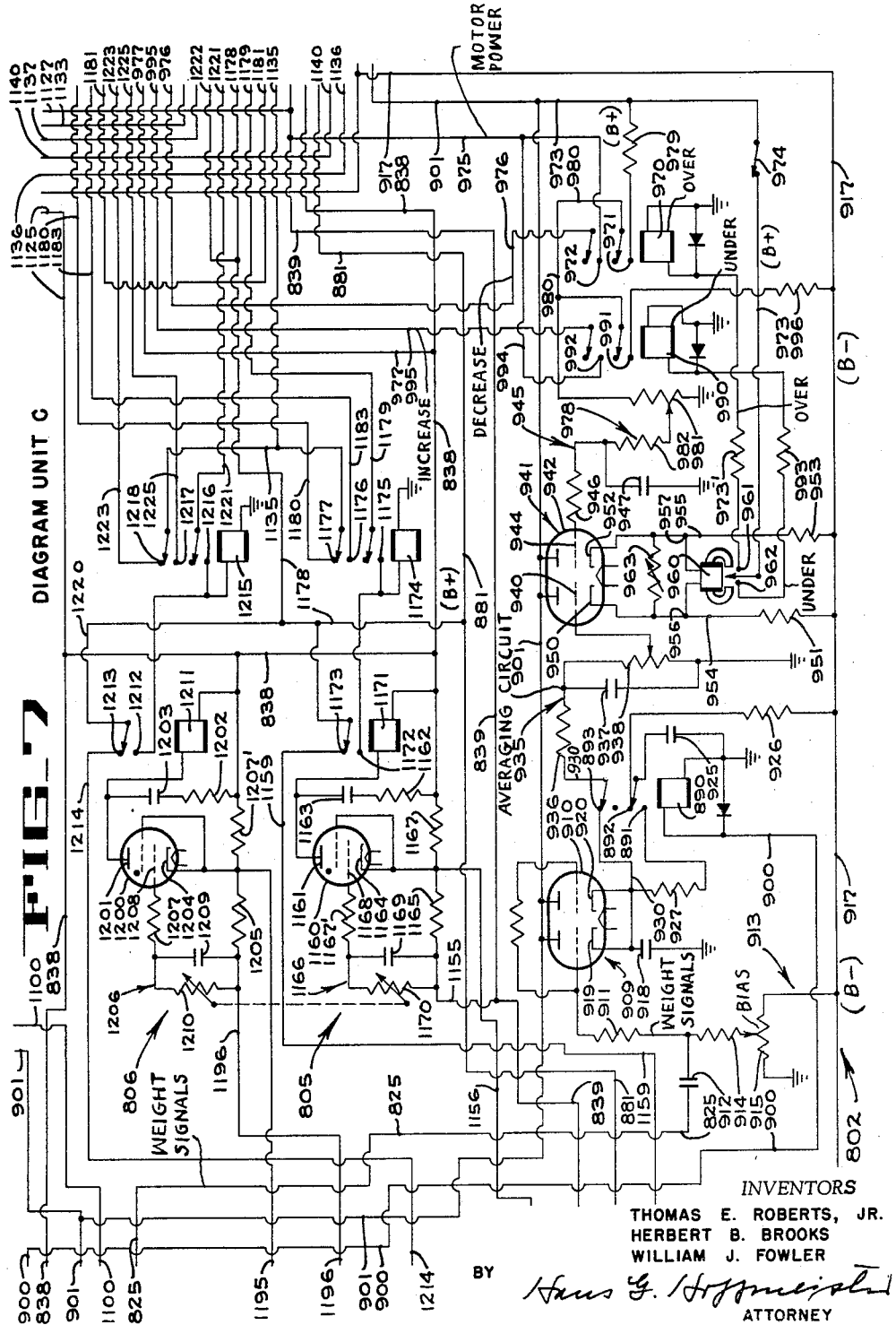

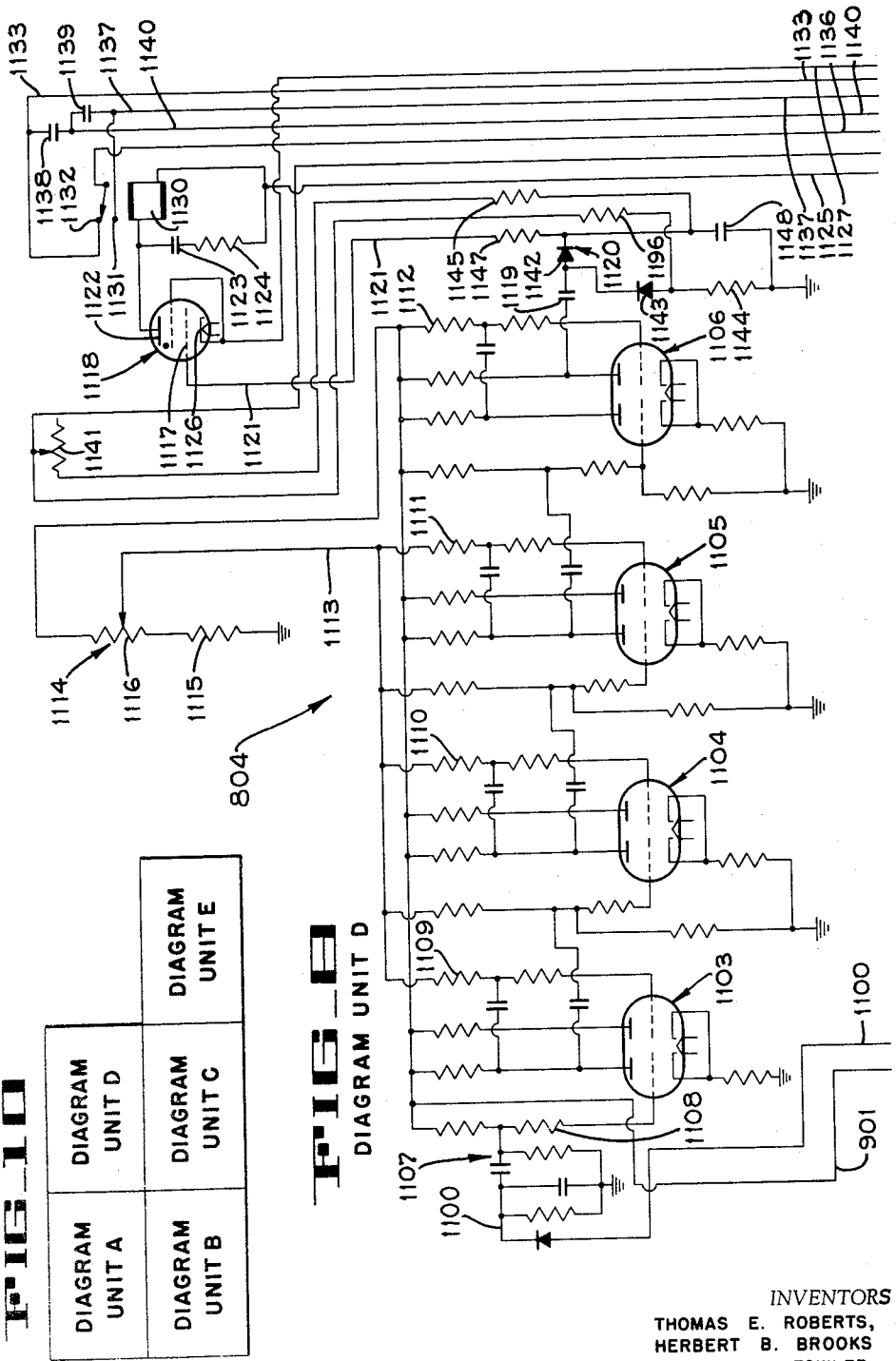

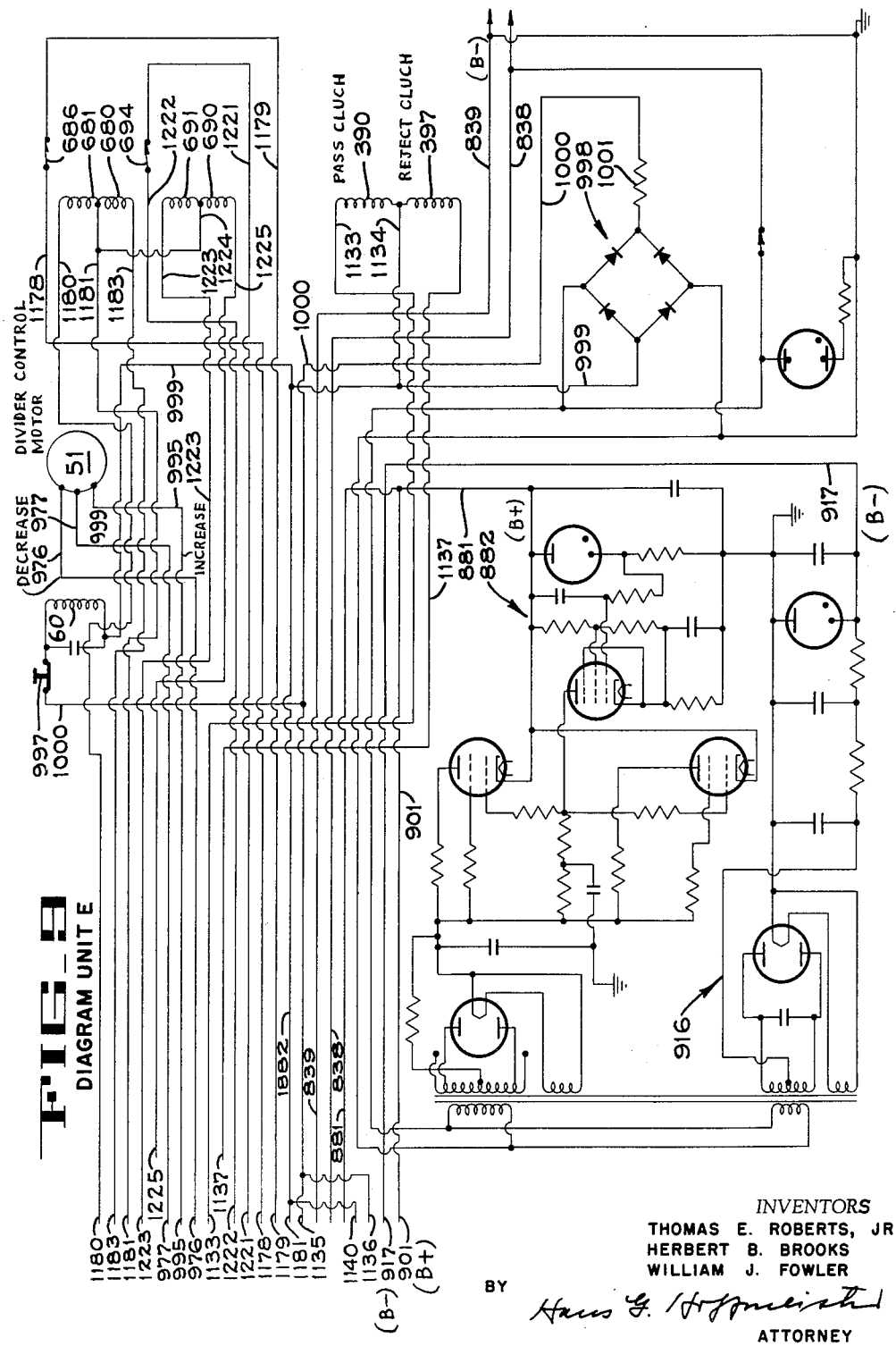

United States Patent Office 3,160,320
Patented Dec. 8, 1964

3,160,320
WEIGHT CHECKING AND CORRECTING
APPARATUS CONTROL
Thomas E. Roberts, Jr., Saratoga, and William J. Fowler, San Jose, Calif., and Herbert B. Brooks, Scarborough, England, assignors to FMC Corporation, a corporation of Delaware
Original application Jan. 26, 1959, Ser. No. 789,124, now Patent No. 3,096,837, dated July 9, 1963. Divided and this application Oct. 30, 1962, Ser. No. 234,029
8 Claims. (Cl. 222—55)

The present invention relates to weight checking and correcting apparatus, and more particularly to the control thereof, for correcting a discharge machine in response to the weighing of successive articles discharged by the machine. Such controls have many uses in the Fluent Material Handling, Dispensing, and Automatic Weight Control arts in general. A specific example of the problems involved and their solution will be given in connection with the dispensing of dough in a bakery. This application is a division of the application of Abbott et al., Ser. No. 789,124, filed January 26, 1959, now Patent 3,096,837 issued July 9, 1963, and assigned to the assignee of the present application.

In the commercial processing of manufacturing baked goods, pieces of dough are formed from a mass of dough by a dough divider. The dough divider includes pockets or cells to measure volumetrically the size of the pieces of dough formed therein. Since dough is tacky, viscous substance that varies in density, the forming of pieces of dough in volumetric measuring cells or pockets produced finished products that varied in weight. It is the commercial practice to sell baked goods, such as loaves of bread, by weight. Therefore, the baking industry has been confronted with the problem of ensuring that each item produced meets a prescribed weight requirement without incurring losses resulting from intentionally overweighted items. Further, the baking industry has been confronted with the problem of reducing the number of pieces of dough that are rejected because they fail to meet the prescribed weight requirement. It is desirable to overcome these problems without sacrificing speed of operation and without incurring additional expenses through manual labor.

An object of the present invention is to provide a control for automatically correcting a discharge device in accordance with a series of weight signals resulting from the weighing of the discharged articles.

Another object is to provide an automatic control for a discharging device that is always stabilized about a reference point.

A further object is to provide a discharge device control of the type described wherein both positive and negative corrections to the discharge device are provided with simple circuitry.

An object of the present invention is to provide a control of type described that provides adequate correction of the discharge device, but which is not overly delicate and sensitive in that it does not call for the instantaneous correction of each error detected in the weighing device. The control of the present invention corrects the discharge device in accordance with the stably referenced, average error signals.

Other objects and advantages of the present invention will become apparent from the following description and drawings in which:

FIG. 1 is a perspective of the weight checking and correcting apparatus of the present invention, in operative association with a dough dividing machine.

FIG. 2 is a plan of the weight checking and correcting apparatus of the present invention shown with the dough dividing machine.

FIG. 3 is an enlarged horizontal section taken along line 3—3 of FIG. 1.

FIG. 4 is a block diagram of the electronic circuits employed in the weight checking and correcting apparatus of the present invention.

FIGS. 5–9, inclusive, comprise units A, B, C, D and E, respectively, of a control diagram which, when arranged in the manner shown in FIG. 10, illustrate schematically the electronic circuits shown in block diagram in FIG. 4.

In FIGS. 1 and 2 is illustrated a conventional dough dividing machine A that forms individual measured pieces of dough from a mass of dough, each individual piece being adapted to be formed into a single article, such as a loaf of bread. The machine advances the measured pieces of dough in succession onto a continuously operated conveyor B which projects upwardly and away from the dough dividing machine A.

The conveyor B feeds the spaced pieces of dough in succession onto a weight checking apparatus C, which continuously advances the pieces of dough in the direction indicated by an arrow 30. The weight checking apparatus C weighs the continuously advancing pieces of dough individually and transmits successive voltage signals representative of the weight of the successively weighed pieces of dough.

The pieces of dough are then advanced from the weight checking apparatus C onto a continuously operated transfer conveyor D, which feeds the pieces of dough to a reversible conveyor E. The pieces of dough discharged onto the reversible conveyor E are continuously advanced transversely of the conveyor D either in the direction indicated by an arrow 31 (FIG. 2) or in the direction indicated by an arrow 32 (FIG. 2). The reversible conveyor E is driven at a sufficient speed relative to the spacing between successive pieces of dough so that each piece of dough is supported individually by the reversible conveyor E.

Disposed adjacent the reversible conveyor E and spaced from the weight checking apparatus C, as shown in FIG. 2, is a dough correcting apparatus F. The dough correcting apparatus F forms relatively small measured quantities of dough from a mass of dough. When one of the pieces of dough, that was formed by the dough divider A and is advancing toward the reversible conveyor E, is deficient in weight within a predetermined range, the dough discharging apparatus F is operated to deposit onto such an underweight piece of dough a selected quantity of supplemental dough commensurate with the amount the piece of dough is deficient in weight. Thus, the correcting apparatus F adds increments of dough to the main piece of dough provided by the dough divider A. As will be explained presently, the apparatus F is adapted to selectively provide supplemental increments of dough in three different sizes since it is capable of discharging either one of two increments of different sizes or of discharging both increments simultaneously.

Adjacent the dough discharging apparatus F is a control unit G (FIG. 1) for mounting the components of electronic control circuits H (FIG. 4), which receive the successive voltage signals transmitted by the weight checking apparatus C. As previously described, the successive voltage signals are representative of the weights of successively weighed pieces of dough. The electronic control circuits H perform several control operations in response to the voltage signals and in response to the advancement of pieces of dough on the weight checking apparatus C. One control operation which forms the subject matter of the present invention is the adjustment of the dough dividing machine A for regulating the weight of measured pieces of dough formed therein to compensate for a weight variation between a desired weight and the average weight of pieces of dough advancing successively across the check weighing apparatus C.

Another operation of the electronic control circuits H which is not part of the present invention and which is described in detail in the aforesaid patent, is the regulation of the direction of travel of the reversible conveyor E. When a piece of dough weighing more than a prescribed weight is discharged by the transfer conveyor D onto the reversible conveyor E, the reversible conveyor E advances the piece of dough of prescribed weight in the direction shown by the arrow 31 (FIG. 2) for further processing. In case a piece of dough of a weight less than said prescribed weight and less than a predetermined minimum weight is processed by the weight checking apparatus C, the electronic control circuits H reverse the direction of travel of the conveyor E to advance the piece of dough in the direction shown by the arrow 32, thereby rejecting the piece of dough weighing less than the predetermined minimum weight. The piece of dough weighing in a range between the prescribed weight and the predetermined minimum weight are advanced by the reversible conveyor E in the direction shown by the arrow 31 toward a subsequent processing station of the plant.

Still another operation of the electronic control circuits is the controlling of the operation of the dough correcting apparatus F to vary the quantity of dough discharged thereby when a piece of dough weighing in the range between the prescribed weight and the predetermined minimum weight is discharged by the conveyor D onto the reversible conveyor E. The electronic control circuits classify each of such pieces of dough into a weight group corresponding to the amount the individual piece of dough weighs less than the prescribed weight, and then operate the dough discharging apparatus F to deposit onto that piece of dough a selected quantity of dough commensurate with the amount that the piece of dough weighs less than the prescribed weight.

The dough dividing machine A (FIGS. 1 and 2) is of conventional design and includes in general a dough supply hopper 40 which supplies dough to a pressure chamber formed within a housing 41 (FIG. 1), and the pressure chamber is equipped with a ram, not shown, for forcing dough into measuring pockets, not shown. A piston 42 (FIG. 1) is provided in each of the measuring pockets and is moved outwardly therefrom by the incoming mass of dough in the associated pocket. As the pistons 42 move outwardly, they engage the free ends of arms 43 of a rocker assembly 44, causing the rocker assembly 44 to rotate in the direction indicated by arrow 45 (FIG. 1). The rocker assembly 44 rotates in the aforementioned direction until fingers 46 thereof engage the upper horizontal surface of an adjustably positioned abutment block 47. The location of the abutment block 47 regulates the size and weight of pieces of dough in the measuring pockets, since the abutment block 47 limits the rotation of the rocker assembly 44 in the direction shown by the arrow 45, and thereby limits the outward, measuring movement of the pistons 42.

The dough in the measuring pockets is sheared off from that in the chamber to leave in the pockets measured quantities of dough. Simultaneously, the pockets and the rocker assembly 44 are lowered as a unit to a discharge station where the pistons 42 are moved inwardly to eject the pieces of dough from the pockets onto an endless belt conveyor 48 (FIG. 1).

The position of the abutment block 47 is adjusted by a screw 49 (FIGS. 1 and 3) that is received in threaded engagement in a tapped opening formed in the abutment block 47. Secured to the screw 49 is a hand wheel 50 that imparts a rotatable movement to the screw 49 for raising or lowering the abutment block 47. Thus the rotation of the screw 49, by means of the manually operated wheel 50, adjusts the height of the abutment 47 which limits the outward measuring movement of the pistons 42, thereby regulating the weight of the pieces of dough discharged from the dough dividing machine A.

While permitting the manual adjustment of the dough dividing machine A, the apparatus of the present invention provides automatic adjustment of the dough dividing machine A for regulating the weight of measured pieces of dough formed by machine A to compensate for a weight variation between a desired weight and the average weight of pieces of dough advancing successively across the weight checking apparatus C. Toward this end, a suitable reversible motor, such as a synchronous motor 51 (FIG. 1), is mounted on the dough dividing machine A adjacent the hand wheel 50. The reversible motor 51 includes a shaft 52 (FIG. 3) that has a sprocket 53 secured thereto. A chain 54 is trained around the sprocket 53 and drives a sprocket 55 that is fixed to a short shaft 56. Secured to a lower portion of shaft 56 for rotation therewith is a spur gear 57 that meshes with a gear 58. The gear 58 is secured to the upper end of a tubular shaft 59 whose lower end is operatively associated with one element of a magnetic clutch 60 (FIG. 1). A shaft 61 (FIG. 3) which has a sprocket 62 keyed to its upper end, projects down through the tubular shaft 59 and is operatively connected at its lower end to a second element of the magnetic clutch. A chain 63 is trained around the sprockets 62 and around a sprocket 65 which is keyed to the aforementioned screw 49. The magnetic cluch 60 is operable to permit the hand wheel 50 to be manually actuated to rotate the screw 49 or to permit the reversible motor 51 to rotate the screw 49. When the magnetic clutch 60 is engaged, the tubular shaft 59 is connected in driving relation with the drive shaft 61 whereby the screw 49 may be rotated by means of the reversible motor 51 and, when the magnetic clutch 60 is disengaged, the tubular shaft 59 and shaft 61 are not connected and the manual operation of the hand wheel 50 will effect adjustment of the position of abutment block 47. Hence, the operation of the reversible motor 51, which is controlled by the electronic control circuits H, causes an adjustment of the dough dividing machine A for automatically regulating the weight of the pieces of dough discharged therefrom.

The pieces of dough ejected from the dough dividing machine A are advanced in succession by the conveyor 48 and are discharged onto the conveyor B (FIG. 1). The conveyor B includes a frame 66 bolted at one end to a gear housing 65 (FIG. 2) that is mounted on the frame of the dough dividing machine A. The frame 66 is generally H-shaped and includes side members 67 and 68 connected by a transverse member 69. At one end of the frame, the side members 67 and 68 journal a drive shaft 70 (FIG. 1) which is driven from gear box 65 and which is connected in driving relation with a drum-like roller 71. At the other end of the frame, the side members 67 and 68 journal an idler shaft 72 which supports idler roller 73. The roller 73 is disposed at a higher elevation than the drive roller 71. Trained around the rollers 73 and 71 is an endless belt 76 that advances the pieces of dough in the direction indicated by the arrow 30. As shown in FIG. 1, the conveyor B projects outwardly away from the dough dividing machine A and is directed upwardly therefrom. The conveyor B feeds the spaced pieces of dough in succession onto the weight checking apparatus C.

WEIGHT CHECKING APPARATUS

The weight checking apparatus C of the present invention comprises a continuously operated conveyor 100 that has an endless belt 101 with its receiving end disposed below the discharge end of the conveyor B for receiving therefrom successively advanced, spaced apart, pieces of dough. The belt 101 extends across the upper surface of a weighing platform 110 and advances the spaced pieces of dough in succession over the platform 110 shown diagrammatically in FIG. 5, to impose the weight of pieces of dough individually upon the platform 110.

Associated with the weighing device platform 110 is an electro-mechanical transducer 130 (FIG. 5) that translates the successive movements of the weighing device platform 110 into voltage signals and transmits successive voltage signals representative of the weight of the pieces of dough advancing in succession across the platform 110. Adjacent the platform 110 is mounted a suitable source of light, such as a lamp 131 (FIGS. 2 and 5), which projects a beam of light over the platform 110 transversely to the path of travel of the pieces of dough. In the path of the projected light is a phototube 132 (FIG. 5) that is operative to send out a control signal each time the light beam is interrupted by a piece of dough advancing on the platform 110. The light beam is interrupted just before the platform 110 reaches maximum deflection from the weight of an advancing piece of dough being imposed thereon.

The details of the weighing device C do not form part of the present invention. A weighing device suitable for use in connection with the control circuit of the present invention is described in detail in the aforesaid Patent 3,096,837. It will be mentioned however, that the weighing platform 110 is damped.

Briefly, and as seen in FIG. 1, the weight checking device C includes a support 140, having a base 141, uprights 142 and 143, and a top support 144. A drive roller 154 for the belt 101 is driven by a motor 150 through a belt and pulleys. A back-up roller 170 holds the conveyor belt against the drive roller 154. A brush 182 is also driven by a belt from motor 150 for cleaning the load bearing surface of the conveyor belt 101.

The electromechanical transducer 130 which translates the movement of the weighing platform 110 into voltage signals, comprises a detector transformer 285 (FIG. 5) and a suitable source of excitation voltage, such as oscillator 286 (FIG. 4). The detector transformer 285 includes a movable core 287 (FIG. 5), which is fixed to the underside of the weighing platform 110 by a suitable mounting pad 288. In addition, the detector transformer 285 comprises a primary winding 289 (FIG. 5) and two secondary windings 290 and 291. The primary winding 289 and the secondary windings 290 and 291 are mounted in fixed position within a suitable cylindrical housing. It is to be observed that the core 287 moves with the deflection of the weighing platform 110 and is disposed centrally of the transformer windings for movement relative thereto.

The housing of the detector transformer BO is adjustably mounted relative to the core 287 by means described in detail in the aforesaid patent, none of which form part of the present invention.

As hereinbefore indicated, the detector transformer 285 with the oscillator 286 is an electromechanical transducer that translates the linear deflection of the platform 110 into voltage signals. For this purpose, the primary winding 289 is energized by the oscillator 286, which is a source of excitation voltage. When the primary winding 289 is energized by the oscillator 286, voltages are induced in the secondary windings 290 and 291, respectively. The secondary windings 290 and 291 are connected in series opposition. Consequently, the two voltages induced in the secondary windings 290 and 291 are opposite in phase and the net voltage across the output of the secondary windings 290 and 291 is the difference of the two voltages. For the electrical center position of the core 287, the net output voltage is zero. This is called the balance point or null position. As the core 287 is displaced from the null position, the voltage induced in the secondary winding toward which the core 287 is moved increases, while the voltage induced in the other secondary winding decreases. This produces a differential voltage across the output of the secondary windings 290 and 291, which varies linearly with the change in core position. Movement of the core 287 in an opposite direction beyond the null position produces a similar linear voltage characteristic, but with the phase of the output voltage shifted 180°.

When the weighing platform 110 is in the undepressed position, which is the no load condition, the core 287 is disposed relative to the windings 289, 290 and 291 so that a desired output voltage is produced across the secondary windings 290 and 291. This is accomplished by manually positioning the secondary windings as explained in the aforesaid patent. When the platform 110 receives a piece of dough of a weight equal to or less than the preload value, the resultant movement of the platform 110, if any, is insufficient to displace the core 287 in a manner to materially alter the output voltage of the detector transformer 285. However, the platform 110, when receiving thereon a piece of dough of a weight in excess of the preload value, moves the core 287 sufficiently to effect a material voltage change in the output of the transformer 285. It is to be observed, however, that the detector transformer 285 detects the magnitude of linear descent of the platform 110 and produces a signal indicative of such magnitude. This, of course, is a function of the amount by which the weight of a piece of dough advancing on the platform 110 exceeds the predetermined preload value.

In FIGS. 1 and 2 is shown a tunnel-shaped shield 284, which is secured to the top support 144 and is disposed over the weighing platform 110. Mounted in the shield 284 adjacent one side of the platform 110 is the phototube 132 (FIGS. 2 and 5) and mounted in the shield 284 adjacent the other side of the platform 110 is the lamp 131. The shield 284 prevents light other than the light projected by the lamp 131 from affecting the operation of the phototube 132. The lamp 131 and the phototube 132 are centrally located with respect to the ends of the weighing platform 110. The phototube 132 is operative to effect a control signal each time the light beam, which is projected by the lamp 131, is interrupted by a piece of dough advancing on the platform 110.

In operation of the weight checking apparatus C, spaced pieces of dough are successively advanced by the conveyor 100 in a continuous procession over the weighing platform 110 and the weighing device 120 which weighs individually each piece of dough advancing thereacross. The platform 110 descends when the weight of a piece of dough thereon is in excess of the predetermined preload value. This movement of the scale platform 110 causes displacement of the core 287 relative to the windings 289, 290 and 291 to effect the production of a net voltage across the secondary windings 290 and 291 and provides a signal to line 817 of an amplifier 800 (FIG. 5), that is representative of the magnitude of depression of the weighing platform 110. While a piece of dough is advancing across the platform 110 and just before maximum deflection is attained by the platform 110, the light beam projected by the lamp 131 toward the phototube 132 is interrupted, thereby causing the phototube 132 to effect a control signal. From the weighing platform 110, the weighed pieces of dough are successively discharged onto the conveyor D.

Weighed pieces of dough are advanced successively from the weight checking apparatus C onto the continuously operated conveyor D (FIG. 2). The conveyor D includes an endless belt 300 having its receiving end disposed adjacent to and below the discharge end of belt 101 of the conveyor 100. A motor 301 and pulley arrangement (not shown) continuously drive the conveyor belt 300 in the direction shown by the arrow 30 and the weighed pieces of dough on the conveyor belt 300 are advanced in succession and in spaced relation.

The reversible conveyor E of the present invention is disposed below the discharge end of the conveyor D and is arranged to receive pieces of dough from the conveyor D. An endless conveyor belt 305 is included in the reversible conveyor E and this belt is driven at a sufficient speed relative to the spacing between successive pieces of dough so that only one piece of dough at a time is supported by the reversible conveyor E. Individual pieces of dough that are discharged onto the reversible conveyor E are advanced by conveyor E in a direction transversely of the conveyor D, either in the direction indicated by the arrow 31 or in the direction indicated by the arrow 32. Pieces of dough advanced in the direction indicated by the arrow 31 are of a weight equal to or in excess of the predetermined minimum weight and are discharged onto a conveyor 306 (FIG. 2) for further processing. Pieces of dough advanced in the direction shown by the arrow 32 weigh less than the predetermined minimum weight and are discharged onto a reject conveyor 307 (FIG. 2).

Details of the reversible conveyor E, which form no part of the present invention, are fully described in the aforesaid Patent 3,096,837. Suffice to say that the belt 305 of the reversible conveyor E is driven by electrically controlled clutches 390 and 397, shown schematically in FIG. 4.

The operation of the electrically operated clutches 390 and 397 is controlled by the electronic control circuits H in the control unit G in a manner to be described in detail hereinafter. When a piece of dough moving toward the reversible conveyor E is of the prescribed weight or weighs between the prescribed weight and the predetermined minimum weight, the clutch 390 is engaged and the clutch 397 is disengaged. Therefore, a piece of dough on the conveyor belt 305 weighing at least the predetermined minimum weight is advanced continuously toward the conveyor 306 and discharged onto this conveyor for movement to a processing station.

In case a piece of dough is discharged onto the reversible conveyor E that weighs less than the predetermined minimum weight, the electronic control circuits H cause the clutch 397 to engage and cause the clutch 390 to disengage. This action causes the conveyor belt 305 to reverse its direction of travel and to advance the piece of dough thereon, which weighs less than the predetermined weight, toward the reject conveyor 307.

When a piece of dough of a weight between the prescribed weight and the predetermined minimum weight is moved toward the reversible conveyor E, the dough discharging apparatus F is operated to deposit onto such a piece of dough a quantity of dough commensurate with the amount the piece of dough weighs less than the prescribed weight. For this purpose, the dough discharging apparatus F comprises a dough supply hopper 415 that is removably secured to the upper side of the platform 375 by a plurality of clamp blocks that are bolted to the platform. The upper end of the hopper 415 is sealed by a cover 421 that is mounted for pivotal movement by brackets 419.

The reversible reject conveyor E is driven by an electric motor (not shown) which in turn drives a normally engaged "pass" magnetic clutch 390, shown diagrammatically in FIG. 9, and a normally disengaged "reject" magnetic clutch 397, also shown diagrammatically in FIG. 9. Clutch 390 drives the pass conveyor 306 (FIG. 2) through a chain and sprocket assembly 402, whereas the reject clutch 397 drives the reject conveyor 307 through a chain and sprocket assembly 403 (FIG. 2). The details of this drive are not part of the invention, and are fully described in the aforesaid Patent 3,098,837.

In order to correct underweight pieces of dough that are within certain weight limits, the dough correcting apparatus F includes a pair of dough increment casting arms 502, 503 (FIG. 1) operated by magnetic clutches 680 and 690 (FIG. 4), and brakes 681 and 691. This mechanism is described in detail in the aforesaid Patent 3,096,837, and those details do not form part of the present invention.

ELECTRONIC CONTROL CIRCUITS

The electromechanical transducer 285 (FIG. 4) of the weight checking apparatus C transmits successive voltage signals that are respectively representative of the weights of pieces of dough advancing in succession across the weight checking apparatus C. The voltage signals are amplified by a suitable amplifier 800 (FIG. 4). Each piece of dough that advances across the weight checking apparatus C interrupts the beam of light projected by the light source 131 (FIG. 4) toward the phototube 132 (FIG. 4) just before maximum deflection is attained by the scale of the weight checking apparatus C. When the beam of light emitted by the light source 131 is interrupted by a continuously advancing piece of dough, the phototube 132 operates a relay circuit 801 (FIG. 4).

In FIG. 4 are illustrated diagrammatically the electronic control circuits H that are employed in the weight checking and correcting apparatus of the present invention. The electronic control circuits H include a dough divider control circuit 802 (FIG. 7) that is responsive to the successive voltage signals transmitted by the transducer 130 and is responsive to the operation of the relay circuit 801 (FIG. 5), to convert the successive voltage signals into a series of pulses. The series of pulses are respectively representative of the difference between a desired weight and the weights of the pieces of dough advancing in succession across the weight checking apparatus C. The control circuit 802 averages the series of pulses to produce an average signal and compares the average signal with reference voltages for controlling the direction of rotation of the dough divider control motor 51 and the angular displacement of the drive shaft of the motor 51. In this manner, the dough dividing machine A is adjusted to regulate the weight of pieces of dough formed therein to compensate for a weight variation between a desired weight and the average weight of pieces of dough advancing in succession across the weight checking apparatus C.

In addition to the adjustment of the dough divider A for regulating the weight of pieces of dough ejected therefrom, the electronic control circuits H control the direction of travel of the reversible conveyor E and control the operation of the dough discharging apparatus F. Toward this end, the electronic control circuits H include a weight classifying circuit 803 (FIG. 4) that is conditioned for operation with the successive advancement of pieces of dough across the weight checking apparatus C by the operation of the phototube relay circuit 801 and is operated in response to the successive voltage signals transmitted by the electromechanical transducer 130 for classifying individually the pieces of dough in accordance with their weight.

When a piece of dough, which is of the prescribed weight or is overweight, is advanced across the weight checking apparatus C, the weight classifying circuit 803 operates to prevent activation of a reject control circuit 804, whereby the normally operated clutch 390 (FIG. 4) of the reversible conveyor E is engaged at the time the piece of dough of the prescribed weight or overweight is discharged onto the reversible conveyor E. While the clutch 390 is engaged, the conveyor E advances the piece of dough to the conveyor 306 (FIG. 2) for further processing.

In case a piece of dough of a weight less than the predetermined minimum weight advances across the weight checking apparatus C, the phototube relay circuit 801 applies a potential through the weight classifying circuit 803 to activate the reject control circuit 804. The activation of the reject control circuit 804 causes the clutch 397 (FIG. 4) of the reversible conveyor E to be engaged at the time the piece of dough weighing less than the predetermined minimum weight is discharged onto the reversible conveyor E. When the clutch 397 is engaged, the direction of travel of the conveyor E is reversed and the piece of dough weighing less than the predetermined minimum weight is discharged onto the ject conveyor 307 (FIG. 2).

In the event a piece of dough of a weight in the range between the prescribed weight and the predetermined minimum weight is advanced across the weight checking apparatus C, the weight classifying circuit 803 operates to prevent the activation of the reject control circuit 804. Thus, the normally operated clutch 390 is engaged at the time such a piece of dough is discharged onto the reversible conveyor E. While the clutch 390 is engaged, the conveyor E advances continuously the piece of dough toward the conveyor 306 (FIG. 2).

At the time the weight classifying circuit 803 operates to prevent the activation of the reject control circuit 804, it also classifies the piece of dough weighing in the range between the prescribed weight and the predetermined minimum weight in accordance with the amount the piece of dough weighs less than the prescribed weight. If the piece of dough weighs less than the prescribed weight by an amount not in excess of a predetermined quantity, such as one-half ounce, the weight classifying circuit 803 prepares an operating circuit for a dough discharge control circuit 805. The dough discharge control circuit 805 is operated by the relay circuit 801 and causes the clutch 680 (FIG. 4) of the dough correcting apparatus F to engage and causes the brake 681 of the dough correcting apparatus F to release in timed relation with the advancement of the continously advancing piece of dough so that the dough correcting apparatus F projects a measured quantity of dough, such as one-half ounce, at the time the continuously advancing piece of dough is discharged from the conveyor D to the reversible conveyor E. The additional quantity of dough is projected onto the piece of dough and when the piece of dough is advanced by the reversible conveyor E, it meets the prescribed weight requirement.

In case the piece of dough advancing across the weight checking apparatus C weighs less than the prescribed weight by an amount within a selected range, such as between one-half ounce and one ounce, the weight classifying circuit 803 prepares an operating circuit for a dough discharge control circuit 806. The dough discharge control circuit 806 is operated by the relay circuit 801 and causes the clutch 690 (FIG. 4) of the dough correcting apparatus F to engage and causes the brakes 691 of the dough correcting apparatus F to release in timed relation with the advancement of the continuously advancing piece of dough so that the dough discharge apparatus F projects a measured quantity of dough, such as one ounce, at the time the continuously advancing piece of dough is discharged from the conveyor D to the reversible conveyor E. The additional quantity of dough is projected onto the piece of dough, and when the piece of dough is discharged onto the reversible conveyor E, it meets the prescribed weight requirement.

If the piece of dough weighs less than the prescribed weight by an amount within another selected range, such as between one ounce and one and one-half ounces, the weight classifying circuit 803 prepares an operating circuit for the dough discharge control circuits 805 and 806. The above described operations are then repeated and the dough correcting apparatus F projects a measured quantity of dough, such as one and one-half ounces, onto the continuously advancing piece of dough when the piece of dough is discharged from the conveyor D to the reversible conveyor E so that the piece of dough advanced by the reversible conveyor E meets the prescribed weight requirement.

Referring to FIG. 5, the electromechanical transducer 130 of the weight checking apparatus C comprises the suitable oscillator 286 and the detector transformer 285. In the preferred embodiment, the oscillating frequency for the oscillator 286 is 2 kc. with a stable output voltage. The input winding 289 of the detector transformer 285 has one end thereof connected to ground through a conductor 810. At the other end, the winding 289 is connected to an output circuit 811 of the oscillator 286 through a conductor 812. Thus, the input winding 289 of the detector transformer 285 is excited by the oscillator 286.

The output windings 290 and 291 of the detector transformer 285 are connected in series opposition and the voltages induced therein are opposite in phase. As previously described, the core 287 of the detector transformer 285 is displaced relative to the windings of the detector transformer 285 as the scale of the weight checking apparatus C is deflected. This produces a differential voltage across the output of the secondary windings 290 and 291, which varies linearly with the change in the position of the core 287. Therefore, the detector transformer 285 detects the magnitude of linear descent of the scale of the weight checking apparatus C and produces a signal indicative of such magnitude. This, of course, is a function of the amount by which the weight of a piece of dough exceeds the predetermined preload value of the scale in the weight checking apparatus C.

The amplifier 800 (FIG. 5) has its input circuit 816 connected to one end of the serially connected output windings 290 and 291 of the detector transformer 285 through a conductor 817, while the other end of the serially connected windings 290 and 291 is connected to ground through a conductor 818. Hence, the voltage signals transmitted by the detector transformer 285 are received by the amplifier 800.

Suitable amplification of the voltage signals transmitted by the detector transformer 285 is provided by stages 820–822, inclusive, of the amplifier 800. A feedback network 823 interconnects an output circuit 824 of the amplifier 800 to its input circuit 816 to produce a stabilized output. The feedback network 823 is connected to a variable resistor 819 of the output circuit 825. Connected to the output circuit 824 of the amplifier 800 is a conductor 825 over which is transmitted the successive voltage signals that are representative of the weight of pieces of dough advancing in succession across the weight checking apparatus C.

A conventional power supply 830 (FIG. 5) supplies a suitable plate voltage for the oscillator 286 and the amplifier 800 through a conductor 831. Across the output of the lower supply 830 is connected a voltage regulating tube 832. The power supply 830 includes a transformer 833 that has a secondary winding 834, which supplies power to the light source 131 of the weight checking apparatus C over conductors 835 and 836. A source of alternating current (FIG. 9) is connected to the primary winding 837 of the transformer 833 over conductors 838 and 839.

The phototube 132 controls the operation of the relay circuit 801 (FIG. 5), which includes an amplifier 840 and a voltage divider 841. The cathode 842 of the amplifier 840 is connected to ground by way of conductor 843 of the voltage divider 841. A grid resistor 844 of the amplifier 840 is connected at a junction 845 between serially connected resistors 846 and 847 of the voltage divider 841. Connected to the resistor 846 through the conductor 843 is a resistor 848 of the voltage divider 841, said resistor 848 being connected to the negative side of the power supply 830 by way of a conductor 849, and connected to the resistor 847 is a resistor 850 of the voltage divider 841, said resistor 850 being connected to the positive side of the power supply 830 through a conductor 851. Across the voltage divider 841 are connected voltage regulating tubes 852 and 853. In the output circuit of the amplifier 840 is a relay 860, which connects the plate 854 of the amplifier 840 to the resistor 850. The cathode 855 of the phototube 132 is connected to the resistor 848 at a junction 856, which is connected to the negative side of the power supply 830 through the conductor 849. The plate 857 of the phototube 132 is connected to the resistor 846 at the junction 845. Hence, the phototube 132 is connected across the resistors 846 and 848 of the voltage divider 841.

When the beam of light emitted by the light source 131 is not interrupted, the phototube 132 conducts. As a result thereof, the resistors 846 and 848 of the voltage divider 841 are effectively shunted and a negative potential from the junction 856 is applied to the grid resistor 844 at the junction 845 for biasing the amplifier 840 to cut-off. Therefore, the amplifier 840 is rendered substantially non-conductive and the relay 860 is not energized. During the time an advancing piece of dough interrupts the light beam projected by the light source 131, the phototube 132 is rendered substantially non-conductive. Consequently, the end of the resistor 846 opposite the junction 845 is at ground through the conductor 843 and the end of the resistor 847 opposite the junction 845 is at a positive potential through the resistor 850. Therefore, a positive potential is applied to the grid resistor 844 at the junction 845 to render the amplifier 840 conductive. The conduction of the amplifier 840 causes the relay 860 to be energized and to operate.

The operation of the relay 860 causes contacts 862 and 864 to open and further causes contacts 861 and 863 to close. When contacts 863 are closed, an operating circuit is completed to operate a relay 870 (FIG. 6) of the relay circuit 801 over the following path: ground, relay 870, conductor 880, contacts 863, conductor 881 and the positive side of power supply 882 (FIG. 9). The closing of contacts 861 completes an operating circuit for a transfer relay 890 (FIG. 7) of the divider control circuit 802 over the following path: ground, relay 890, conductor 900, contacts 861 (FIG. 5), conductor 901, conductor 881 (FIG. 9), and the positive side of the power supply 882.

As shown in FIG. 7, the divider control circuit 802 comprises a detector 909, which includes a duo-triode tube 910. The grids of the tube 910 are connected to a grid resistor 911 and the grid resistor 911 is connected to the conductor 825 through a blocking capacitor 912. Over the conductor 825 is transmitted the successive voltage signals from the amplifier 800 that are respectively representative of the weight of pieces of dough advancing in succession across the weight checking apparatus C.

An adjustable biasing network 913 (FIG. 7) of the divider control circuit 802 is also connected to the grid resistor 911 of the detector 909 and includes a resistor 914 and a potentiometer 915. One end of the resistor 914 is connected to the grid resistor 911, while the other end of the resistor 914 is connected to the adjustable contact of the potentiometer 915. The potentiometer 915 at one end is connected to ground end, at its other end, the potentiometer is connected to the negative side of a power supply 916 (FIG. 9) through a conductor 917. By means of this biasing arrangement, the detector 909 conducts in response to the peak portions of the aforementioned voltage signals that are transmitted over the conductor 825.

In the cathode circuit of the detector 909 is a capacitor 918 that is connected at one end to the cathodes 919 and 920 of the duo-triode tube 910 and, at its other end, the capacitor 918 is connected to ground. The capacitor 918 charges positively as the detector 909 conducts, and the detector 909 conducts in response to the portion of a voltage signal, transmitted over the conductor 825 by the amplifier 800, that overcomes the biasing potential applied to the grid resistor 911 of the detector 909 by the biasing network 913.

The transfer relay 890 of the divider control circuit 802 is normally deenergized. At that time, contacts 891 are opened and contacts 892 and 893 are closed. When contacts 892 are closed, a capacitor 925 (FIG. 7) charges to a predetermined negative potential over the following path: ground, capacitor 925, contacts 892, resistor 926, conductor 917 and the negative side of the power supply 916 (FIG. 9). Upon energizing the transfer relay 890, contacts 891 close and contacts 892 and 893 open. The breaking of the contacts 892 opens the charging circuit for the capacitor 925 to disconnect the capacitor 925 from the negative side of the power supply 916, 917. The closing of the contacts 891 completes a discharging circuit for the negatively charged capacitor 925 over the following path: ground, capacitor 925, contacts 891, resistor 927, capacitor 918 and back to ground. Hence, the capacitor 925 discharges to charge the capacitor 918 of the detector 909 to a negative reference potential of a predetermined magnitude.

As previously described, the transfer relay 890 is energized when the relay 860 (FIG. 5) is operated. The relay 860 is operated just before the scale of the weight checking apparatus C attains maximum deflection from the weight of a piece of dough imposed thereon. Therefore, the capacitor 918 of the detector 909 is charged by the capacitor 925 to the negative reference potential just prior to the time the detector 909 receives a voltage signal representative of the weight of the piece of dough advancing across the weight checking apparatus C. When the detector 909 received the just-mentioned voltage signal, it conducts. The conduction of the detector 909 reduces the negative potential on the capacitor 918 and may charge the capacitor 918 positively dependent upon the difference between the magnitude of the voltage signal and the biasing potential on the detector 909.

The biasing network 913 is adjusted so that the charge remaining on the capacitor 918 is zero when the detector 909 conducts in response to a voltage signal representative of the weight of a piece of dough of a desired weight. The term desired weight is used to indicate the weight desired for each piece of dough leaving the dough divider. It is not the final, or prescribed, weight. The desired weight is greater than the predetermined minimum weight but may be less than the prescribed weight so that the processing of pieces of dough that weigh in excess of the prescribed weight will be minimized. If an incoming voltage signal is representative of the weight of a piece of dough weighing more than the desired weight, the charge remaining on the capacitor 918 will be positive. In case an incoming voltage signal is representative of the weight of a piece of dough weighing less than the desired weight, the charge remaining on the capacitor 918 will be negative.

When a piece of dough advancing across the weight checking apparatus C no longer interrupts the light beam projected toward the phototube 132, the relay 860 is deenergized and contacts 861 open to release the transfer relay 890. Upon the release of the transfer relay 890, contacts 891 open to disconnect the capacitor 918 of the detector 909 from the capacitor 925 and contacts 892 close to complete the charging circuit for the capacitor 925. In addition, the releasing of the transfer relay 890 closes contact 893 to establish a circuit for transmitting, over a conductor 930, a voltage pulse from the voltage remaining on the capacitor 918 of the detector 909. The voltage pulse is representative of the difference between the desired weight for pieces leaving the dough divider and the weight of the piece of dough advancing across the check weighing apparatus C. The above operations occur each time a piece of dough is weighed by the check weighing apparatus C. Accordingly, the detector 909 converts the successive voltage signals transmitted by the amplifier 800 into a series of pulses respectively representative of the difference between the desired weight and the weight of pieces of dough advancing in succession across the weight checking apparatus C.

The series of pulses are received by an averaging network 935 of the divider control circuit 802 that comprises a resistor 936, a capacitor 937 and a potentiometer 938. One end of the resistor 936 is connected to the armature of the transfer relay 890 that establishes a connection with the contacts 893. At the other end, the resistor 936 is connected to one side of the capacitor 937. The other side of the capacitor 937 is connected to ground. The potentiometer 938 is connected in parallel with the capacitor 937 and its adjustable connection, which shunts out a portion of the resistance of the potentiometer 938, is connected to a grid 940 of a differential detector 941. The averaging network 935, which has a relatively long time constant compared with the time duration between successive pulses, averages the series of pulses received from the detector 909 and transmits to the differential detector 941 of the divider control circuit 802 an average signal. It is to be observed that the average signal produced by the averaging network 935 is not the result of a finite series of pulses, but it is a continuous signal reflecting an average of a series of pulses that is continuously produced by the detector 909.

The differential detector 941 comprises a duo-triode tube 942 that has its grid 940 connected to the adjustable connection of the potentiometer 938 in the averaging network 935 for receiving therefrom an average signal. Another grid 944 of the duo-triode tube 942 is connected to a biasing network 945, which includes a resistor 946 and a capacitor 947, for impressing thereon a reference voltage. One end of the resistor 946 is connected to the grid 944 and the other end of the resistor 946 is connected to the capacitor 947, which is connected to ground. In the divider control circuit 802 of the present invention, the reference voltage impressed on the grid 944 of the duo-triode tube 942 by the biasing network 945 is zero.

A cathode 950 of the duo-triode tube 942 is connected to a resistor 951, which is connected to the negative side of the power supply 916 (FIG. 9) through the conductor 917. Likewise, the other cathode 952 is connected to a resistor 953, which is connected to the negative side of the power supply 916 through the conductor 917. The resistors 951 and 953 have the same resistance values and, hence, cathode circuits 954 and 955 of the differential detector 941 are balanced. Interconnecting the cathode circuits 954 and 955 of the differential detector 941 at junctions 956 and 957 is a polarized relay 960. Connected in parallel with the polarized relay 960 is a variable resistor 963 that is adjustable for regulating the sensitivity of the polarized relay 960.

When an average signal produced by the averaging network 935 has a magnitude representative of the desired weight for pieces of dough leaving the dough divider, the voltage applied to the grid 940 of the differential detector 941 by the averaging network 935 is zero. Since the reference voltage applied to the grid 944 of the differential detector 941 by the biasing network 945 is zero, each tube section of the duo-triode tube 942 has a current flow of equal magnitude. Hence, the current flow in each of the cathode circuits 954 and 955 of the differential detector 941 has a current flow of equal magnitude. Consequently, the potential difference between the junctions 956 and 957 is zero and the polarized relay 960 remains deenergized.

In case an average signal produced by the averaging network 935 has a positive magnitude, which is representative of an average weight in excess of the desired weight, the voltage applied to the grid 940 of the differential detector 941 is more positive than the reference voltage applied to the grid 944 of the differential detector 941. As a consequence thereof, the tube section of the duo-triode tube 942 controlled by the grid 940 conducts more current than the tube section of the duo-triode tube 942 controlled by the grid 944. Therefore, there is a greater current flow in the cathode circuit 954 of the differential detector 941 than is present in the cathode circuit 955. This results in a potential difference between the junctions 956 and 957 of the cathode circuits 954 and 955, respectively, to cause the polarized relay 960 to operate. The operation of the polarized relay 960 under the above-described conditions closes contacts 961 to complete an energizing circuit for a divider control relay 970 over the following path: ground, relay 970, resistor 973′, contacts 961, conductor 973, microswitch 974, conductor 901 and the positive side of the power supply 882 (FIG. 9).

Upon energizing the relay 970, contacts 971 and 972 close. The closing of contacts 972 completes an operating circuit for the divider control motor 51 over the following path: one side of the source of alternating current (FIG. 9), conductor 839, conductor 975 (FIG. 7), contacts 972, conductor 976, motor 51 (FIG. 9), conductor 977, conductor 838, and back to the other side of the source of alternating current. Accordingly, the reversible motor 51 is operated so that its drive shaft rotates in a direction to decrease the weight of pieces of dough formed within the dough divider A whenever the average signal produced by the averaging network 935 indicates that the pieces of dough passing over the weight checker C is in excess of the desired weight for pieces of dough leaving the divider.

The closing of contacts 971 of relay 970 (FIG. 7) completes a circuit to apply a fixed positive potential to a bias control network 978 (FIG. 7) over the following path: positive side of power supply 882 (FIG. 9), conductor 901, conductor 973 (FIG. 7), resistor 979, contacts 971, conductor 980, and the bias control network 978. The bias control network 978 comprises a variable resistor 981 and a resistor 982. One side of the resistor 981 is connected to the conductor 980 for receiving a positive voltage from the power supply 882 and the other side of the resistor 981 is connected to ground. At the adjustable connection, the resistor 981 is connected to one end of the resistor 982. The other end of the resistor 982 is connected to the side of the capacitor 947 of the biasing network 945 opposite the ground connection. Thus, a portion of the resistor 981 and the resistor 982 together are connected in parallel with the capacitor 947.

The capacitor 947 of the biasing network 945 charges slowly toward the positive voltage of the bias control network 978 and applies a gradually increased positive potential to the grid 944 of the differential detector 941 through the resistor 946 until the positive potential on the grid 944 of the differential detector 941 is equal to the positive potential on the grid 940 of the differential detector 941, which is impressed thereon by the averaging network 935. When the potential on the grid 944 is equal to the potential on the grid 940, each tube section of the differential detector 941 has a current flow of equal magnitude. Therefore, the current flow in each of the cathode circuits 954 and 955 of the differential detector 941 has a current flow of equal magnitude. As a result thereof, the potential difference between the junctions 956 and 957 is zero and the polarized relay 960 is de-energized.

When the polarized relay 960 is de-energized, contacts 961 break to release the divider control relay 970. When the relay 970 is de-energized, contacts 972 break to open the operating circuit for the divider control motor 51 and contacts 971 break to disconnect the bias control network 978 from the fixed positive potential on the conductor 901. The capacitor 947 of the biasing network 945 then discharges to the aforementioned reference voltage, which is zero. From the foregoing, it is to be observed that the differential detector 941 compares the polarity of an average weight signal with a reference voltage to determine the direction of rotation of the reversible motor 51 and compares the magnitude of the average weight signal with a gradually increased reference voltage of a like polarity to determine the time duration for operating the reversible motor 51. The length of time that the divider control motor 51 operates, which determines the angular displacement of its drive shaft, can be regulated by the variable resistor 981 of the bias control network 978. Accordingly, the dough dividing machine A is regulated to decrease the weight of pieces of dough formed therein to compensate for an overweight variation between the desired and the average weight of pieces of dough advancing in succession across the weight checking apparatus C.

If an average signal produced by the averaging network 935 has a negative magnitude, which is representative of an average weight less than the desired weight, the voltage applied to the grid 940 of the differential detector 941 is more negative than the reference voltage applied to the grid 944 of the differential detector 941 by the biasing network 945. As a consequence thereof, the tube section of the duo-triode tube 942 controlled by the grid 944 conducts more current than the tube section of the duo-triode tube 942 controlled by the grid 940. Therefore, there is a greater current flow in the cathode circuit 955 of the differential detector 941 than is present in the cathode circuit 954. This results in a potential difference between the junctions 956 and 957 of the cathode circuits 954 and 955, respectively, to cause the polarized relay 960 to operate. The operation of the polarized relay 960 under the just-described conditions closes contacts 962 to complete an energizing circuit for a divider control relay 990 over the following path: ground, relay 990, resistor 993, contacts 962, conductor 973, microswitch 974, conductor 901, and the positive side of the power supply 882 (FIG. 9).

When the divider control relay 990 is energized, contacts 991 and 992 close. The closing of contacts 992 completes an operating circuit for the divider control motor 51 over the following path: one side of the source of alternating current (FIG. 9), conductor 839, conductor 975 (FIG. 7), conductor 994, contacts 992, conductor 995, motor 51 (FIG. 9), conductor 977, conductor 838 and the other side of the source of alternating current. Accordingly, the reversible motor 51 is operated so that its drive shaft rotates in a direction to increase the weight of pieces of dough formed within the dough divider A if the average weight of pieces of dough passing over the weight checker is less than the desired weight for pieces being discharged from the dough divider.

The closing of contacts 991 completes a circuit to apply a fixed negative potential to the bias control network 978 over the following path: negative side of the power supply 916 (FIG. 9), conductor 917, resistor 996 (FIG. 28), contacts 991, conductor 980 and the bias control network 978. The capacitor 947 of the biasing network 945 charges slowly toward the negative voltage on the bias control network 978 and impresses a gradually more negative potential on the grid 944 of the differential detector 941 through the resistor 946 until the negative potential on the grid 944 of the differential detector 941 is equal in magnitude to the negative potential on the grid 940 of the differential detector 941, which is impressed thereon by the averaging network 935. When the potential on the grid 944 is equal to the potential on the grid 940, each tube section of the differential detector 941 has a current flow of equal magnitude. Therefore, each of the cathode circuits 954 and 955 of the differential detector 941 has a current flow of equal magnitude. As a result thereof, the potential difference between the junctions 956 and 957 is zero and the polarized relay 960 is deenergized.

Upon deenergizing the polarized relay 960, contacts 962 break to release the divider control relay 990. When the relay 990 is deenergized, contacts 992 break to open the operating circuit for the divider control motor 51 and contacts 991 break to disconnect the bias control network 978 from the fixed negative potential on the conductor 917. The capacitor 947 of the biasing network 745 then discharges to the aforementioned reference voltage, which is zero. The time duration for operating the divider control motor 51 and, hence, the angular displacement of the drive shaft of the motor 51, is controlled by the magnitude of the average signal impressed on the grid 940 of the differential detector 941 and the gradually increased negative voltage impressed upon the grid 944 of the differential detector 941 by the bias control network 978 through the capacitor 947. Therefore, the differential detector 941 compares the polarity of the average weight signal with a reference voltage to determine the direction of rotation of the reversible motor 51 and compares the magnitude of the average signal with a gradually changing reference voltage of a like polarity to determine the time duration for operating the reversible motor 51. In this manner, the dough divider A is regulated to increase the weight of pieces of dough formed therein to compensate for an underweight variation between the desired weight and the average weight of pieces of dough advancing in succession across the weight checking apparatus C.

The above-described operations for compensating for variations between the desired weight and an average weight is repeated until the pieces of dough advancing across the weight checking apparatus C are of the desired weight. When this occurs, the average signal applied to the grid 940 of the differential detector 941 by the averaging network 935 is equal to the reference voltage applied to the grid 944 of the differential detector 941 by the biasing network 945.

The microswitch 974 (FIGS. 1 and 7) of the dough divider A, which is connected to the armature of the polarized relay 960, is actuated to an opened position by a carriage supporting the rocker assembly 44 (FIG. 1) to prevent the operation of the divider control motor 51 (FIGS. 1 and 9) while the fingers 46 (FIG. 1) of the rocker assembly 44 are in engagement with the abutment block 47 and is actuated to a closed position by the carriage, which supports the rocker assembly 44, to permit the operation of the divider control motor 51 during the time the fingers 46 are not in engagement with the abutment block 47.

The magnetic clutch 60 (FIGS. 1 and 9) of the dough divider A is engaged while a manually operated switch 997 (FIG. 9) is closed and is disengaged when the manually operated switch 997 is opened. The energizing circuit for the magnetic clutch 54 is as follows: power supply 998 (FIG. 9), conductor 999, clutch 60, switch 997, conductor 1000, and resistor 1001 and back to the power supply 998. As previously described in connection with the dough divider A, when the magnetic clutch 60 is engaged, the height of the abutment block 47 (FIG. 1) is adjusted automatically by means of the divider control motor 51 and, when the magnetic clutch 60 is disengaged, the height of the adjustment block 47 is adjusted by a manual operation of the hand wheel 50 (FIG. 1).

Illustrated in FIG. 6 is the weight classifying circuit 803 of the electronic control circuit H, which comprises four thyratrons 1010–1013. The thyratrons 1010–1013 have their grid resistors 1018–1021 connected to biasing networks 1022–1025, respectively. Included in the biasing networks 1022–1025 are resistors, 1014–1017, respectively, that interconnect the grid resistors 1018–1021 to the adjustable connections of potentiometer 1026–1029, respectively, of the biasing networks 1022–1025, respectively. The potentiometers 1026–1029 are connected in series and a negative potential is conducted therethrough over the following path: negative side of the power supply 916 (FIG. 9), conductor 917, potentiometers 1026–1029 (FIG. 6), resistor 1030 and ground. From this arrangement, the thyratrons 1010–1013 are progressively biased in their numerical order, whereby each succeeding thyratron has a less negative bias impressed on the grid resistor thereof than does the preceding thyratron.

Connected to the plates 1031–1034 of the thyratrons 1010–1013, respectively, are relays 1040, 1050, 1060 and 1070, respectively, which are connected to a common conductor 1077. The firing of a thyratron will cause the relay in its plate circuit to operate. The grid resistors 1018–1021, inclusive, of the thyratrons 1010–1013, respectively, are connected through blocking capacitors 1078–1081, respectively, to the aforementioned conductor 825. Over the conductor 825 are transmitted the successive positive voltage signals from the amplifier 800 that are representative of the weight of pieces of dough advancing in succession across the weight checking apparatus C.

The potentiometers 1026–1029 of the biasing networks 1022–1025, respectively, are adjusted to control the firing of the thyratrons 1010–1013, respectively, in the following manner:

(a) Thyratrons 1010–1013 fire when a voltage signal transmitted over the conductor 825 is representative of the weight of a piece of dough weighing at least the prescribed weight;

(b) Thyratrons 1011–1013 conduct when a voltage signal transmitted over the conductor 825 is representative of the weight of a piece of dough weighing less than the prescribed weight by an amount not in excess of a predetermined quantity, such as one-half ounce;

(c) Thyratrons 1012 and 1013 fire when a voltage signal transmitted over the conductor 825 is representative of the weight of a piece of dough weighing less than the prescribed weight within a second selected range, such as between one-half ounce and one ounce;

(d) Thyratron 1013 conducts when a voltage signal transmitted over the conductor 825 is representative of the weight of a piece of dough weighing less than the prescribed weight within a third selected range, such as between one ounce and one and one-half ounces;

(e) Thyratrons 1010–1013 do not fire when a voltage signal transmitted over the conductor 825 is representative of the weight of a piece of dough weighing less than the predetermined weight.

As previously described in connection with the divider control circuit 802, the relay 860 (FIG. 5) of the relay circuit 801 is operated when a piece of dough advancing across the weight checking apparatus C interrupts the beam of light projected toward the phototube 132. The beam of light is interrupted just before the scale of the weight checking apparatus C attains maximum deflection from the weight of a piece of dough imposed thereon. The relay 860 remains operated until the piece of dough advancing across the check weighing apparatus C has advanced beyond the beam of light projected by the light source 131.

When the relay 860 is operated, contacts 864 open and contacts 863 close. The closing of contacts 863 causes the relay 870 (FIG. 6) of the relay circuit 801 to be energized in a manner previously described. Upon the energization of the relay 870, contacts 871, 872 and 873 close. The closing of contacts 873 completes a circuit for impressing a positive potential on the plates 1031–1034 of the thyratrons 1010–1013, respectively, in the classifying circuit 803 through the common conductor 1077 in the following manner: positive side of the power supply 882 (FIG. 9), conductor 881, conductor 881 (FIG. 6), contacts 873, resistor 1094, conductor 1095 and conductor 1077. It is to be observed that the relay 870 is operated before the scale of the weight checking apparatus C attains maximum deflection in response to the weight of a piece of dough advancing across the weight checking apparatus C. Hence, the positive potential is applied to the plates of the thyratrons 1010–1013 in the classifying circuit 803 before a voltage signal is transmitted over the conductor 825.

The closing of contacts 872 of the relay 870 (FIG. 6) completes a locking circuit for the relay 870 over the following path: ground, relay 870, contacts 872, conductor 1093, contacts 1092, conductor 881 and to the positive side of the power supply 882. When contacts 871 close, operating circuits are prepared for the reject control circuit 804 and a cycle control relay 1090.

If the piece of dough advancing across the weight checking apparatus C weighs less than the predetermined minimum weight, the magnitude of the voltage signal transmitted by the amplifier 800 over the conductor 825 is insufficient to overcome the bias on the thyratrons 1010–1013 of the weight classifying circuit 803 (FIG. 6). Therefore, the thyratrons 1010–1013 do not fire and the relays 1040, 1050, 1060, and 1070 in the plate circuits of the thyratrons 1010–1013, respectively, do not operate.

When the beam of light projected by the light source 131 (FIG. 5) is no longer interrupted by a piece of dough advancing across the weight checking apparatus C, the relay 860 (FIG. 5) is released to open contacts 863 and to close contacts 864. The breaking of the contacts 863 opens the operating circuit of the relay 870, which is still operated, however, through its locking circuit. The closing of contacts 864 completes a path for activating the reject control circuit 804 (FIG. 8) in the following manner: positive side of the power supply 882 (FIG. 9), conductor 881, contacts 864, conductor 1096, contacts 871, conductor 1097, contacts 1091, conductor 1098, contacts 1043, contacts 1053, contacts 1061, contacts 1074, resistor 1099, conductor 1100 and the reject control circuit 804.

The cycle control relay 1090 is subsequently operated over the following path: positive side of the power supply 882 (FIG. 9), conductor 881, contacts 864 (FIG. 5), conductor 1096, contacts 871 (FIG. 6), conductor 1097, contacts 1091, conductor 1098, contacts 1043, contacts 1053, contacts 1061, contacts 1074, rectifier 1101, time delay network 1102, relay 1090 and ground. The time delay network 1102 delays the operation of the relay 1090 for a time duration sufficient for the reject control circuit 804 to be activated. When the cycle control relay 1090 is energized, contacts 1092 break to release the relay 870 through its locking circuit, and contacts 1091 break to deenergize the relay 1090 and to disconnect the reject control circuit 804 from its activating circuit after the reject control circuit 804 is activated by a reject signal, and to release the relay 1090. When relay 870 (FIG. 6) is deenergized, contacts 873 open to remove the plate voltage from the thyratrons 1010–1013, contacts 872 break to further open the locking circuit for relay 870 and contacts 871 open to further open the activating circuit for the reject control circuit 804 and the energizing circuit of the relay 1090.

The reject control circuit 804 (FIG. 8) comprises conventional multivibrators 1103–1106 which are connected in cascade. An input circuit 1107 of the reject control circuit 804, which interconnects the grid resistor 1108 of the multivibrator 1103 with the conductor 1100, receives the positive reject voltage signal transmitted over the conductor 1100 and produces a pulse that is impressed on the grid resistor 1108 to activate the multivibrator 1103. When the multivibrator 1103 is activated, it produces a voltage pulse that activates the succeeding multivibrator 1104. Thereupon, the multivibrator 1104 produces a pulse which activates the next multivibrator 1105. When the multivibrator 1105 is activated, it produces a pulse that activates the succeeding multivibrator 1106.

Associated with the multivibrators 1103–1106 are time delay networks 1109–1112, respectively, that control their associated multivibrators to establish the time duration between the pulses produced in succession within the reject control circuit 804. Connected to the time delay networks 1109–1112 through a conductor 1113 is a time delay control network 1114, which includes a resistor 1115 and a potentiometer 1116. By adjusting the adjustable connection of the potentiometer 1116, the time constants of the time delay networks 1109–1112 are regulated to control the time duration between the pulses successively produced by the multivibrators 1103–1106.

The pulse produced by the multivibrator 1106 is transmitted to the grid 1117 of a thyratron 1118 over a path including a capacitor 1119, a reject duration control network 1120, and a conductor 1121. An alternating current potential is impressed on the plate 1122 of the thyratron 1118 over the following path: plate 1122, capacitor 1123, resistor 1124, conductor 1125, conductor 838 and the source of alternating current (FIG. 9). The cathode 1126 of the thyratrons 1118 (FIG. 8) is connected to the ground side of the source of alternating current through conductors 1127 and 839.

Connected in series with the plate 1122 of the thyratron 1118 is a relay 1130. The relay 1130 is normally deenergized and, hence, contacts 1132 are normally closed to energize the normally operated clutch 390 (FIG. 9) of the reversible conveyor E over the following path: contacts 1132, conductor 1133, clutch 390, conductor 1134, conductor 999 (FIG. 9), power supply 998, resistor 1010, conductor 1000, conductor 1135, conductor 1136, and back to contacts 1132 (FIG. 8). When the clutch 390 is energized, the clutch is engaged and the reversible conveyor E advances in the direction shown by the arrow 31 (FIG. 2).

The relay 1130 (FIG. 8) is energized while the thyratron 1118 conducts. When relay 1130 is energized, contacts 1132 open and contacts 1131 close. The breaking of contacts 1132 opens the energizing circuit for the normally operated clutch 390 to disengage the clutch 390. The closing of contacts 1131 (FIG. 8) completes an energizing circuit for the reject clutch 397 (FIG. 9) of the reversible conveyor E over the following path: contacts 1131, conductor 1137, clutch 397, conductor 1134, conductor 999, power supply 998, resistor 1001, conductor 1000, conductor 1135, conductor 1136 and back to contacts 1131. When the clutch 397 is energized, the clutch 397 is engaged and the direction of travel of the reversible conveyor E is reversed, whereby a piece of dough on the reversible conveyor E is advanced in the direction shown by the arrow 32 (FIG. 2).

To prevent arcing across the contacts 1131 and 1132 of the relay 1130, capacitors 1138 and 1139 are provided, which are connected to a conductor 1140.

The reject delay control network 1114 is adjusted so that the time interval between the release of relay 860 (FIG. 5) and the energizing of the reject clutch 397 (FIG. 9) is equal to the time it takes for a piece of dough advancing beyond the beam of light projected across the weight checking apparatus C by the light source 131 to be discharged onto the reversible conveyor E. Thus, the reject control circuit 804 by means of the multivibrators 1103–1106 and their associated time delay networks 1109–1112 stores a reject signal and operates the reject clutch 397 in timed relation with the advancement of a piece of dough weighing less than the predetermined minimum weight, whereby the direction of travel of the reversible conveyor E is reversed at the time the piece of dough weighing less than the predetermined weight is discharged onto the reversible conveyor E. It is to be observed that the reject control circuit 804 is capable of storing more than one reject signal, since the multivibrators 1103–1106 are activated in succession. In addition, the reject control circuit 804 in the absence of a reject pulse causes the normally energized clutch 390 to be engaged at the time a piece of dough weighing more than the predetermined minimum weight is discharged onto the reversible conveyor E.

The reject duration control circuit 1120, which comprises a potentiometer 1141, rectifiers 1142 and 1143, resistors 1144–1147 and capacitor 1148, receives a pulse from the multivibrator 1106 and impresses a pulse on the grid 1117 of the thyratron 1118. The pulse impressed on the grid 1117 of the thyratron 1118 by the duration control circuit 1120 attains its maximum magnitude very rapidly and reduces its magnitude from the maximum at a rate determined by the circuit parameters of the control circuit 1120 and the adjustment of the potentiometer 1141. Therefore, the thyratron 1118 conducts substantially at the time the pulse is impressed on its grid 1117 by the control network 1120 and extinguishes when the magnitude of the pulse is no longer sufficient to render it conductive and the negative portion of the alternating current voltage is impressed on its plate 1122.

The potentiometer 1141 (FIG. 8) is adjusted so that the thyratron 1118 conducts and the relay 1130 is energized for a time duration commensurate with the time interval between successive pieces of dough discharged onto the reversible conveyor E. In this manner, the reject clutch 397 is engaged for a sufficient time to enable the reversible conveyor E to discharge a piece of dough weighing less than the predetermined weight onto the reject conveyor 307 (FIG. 2) and, further, the reject clutch 397 will remain engaged until a piece of dough is advanced onto the reversible conveyor E that weighs more than the predetermined weight, since the time interval between pulses in the reject control circuit is substantially equal to the time interval between successive pieces of dough discharged onto the reversible conveyor E. In the absence of a reject pulse, the normally energized clutch 390 will be engaged at the time a piece of dough weighing more than the predetermined weight is discharged onto the reversible conveyor E.

If a piece of dough advancing across the weight checking apparatus C weighs at least the prescribed weight, the magnitude of the voltage signal transmitted by the amplifier 800 is sufficient to overcome the bias on thyratron 1010 (FIG. 6) as well as thyratrons 1011–1013. Therefore, relay 1040, as well as relays 1050, 1060 and 1070, operates. The operation of relay 1040 opens contacts 1043 and closes contacts 1041. The opening of contacts 1043 opens the activating circuit for the reject control circuit 804 (FIG. 8) and the closing of contacts 1041 prepares an operating circuit for the cycle control relay 1090.

When the beam of light projected by the light source 131 (FIG. 5) is no longer interrupted by the piece of dough advancing across the check weighting apparatus C, the relay 860, (FIG. 5) is released to open contacts 863 and to close contacts 864. The breaking of contacts 863 opens the operating circuit for the relay 870 (FIG. 6), which remains operated through its holding circuit. The closing of contacts 864 completes an operating circuit for the cycle control relay 1090 (FIG. 6) over the following path: positive side of the power supply 882 (FIG. 9), conductor 881, contacts 864 (FIG. 5), conductor 1096, contacts 871 (FIG. 6), conductor 1097, contacts 1091, conductor 1098, contacts 1041, conductor 1149, time delay network 1102, relay 1090 and ground. The closing of contacts 864 does not activate the reject control circuit 804, since contacts 1043 of the relay 1040 (FIG. 6) are open. Hence, no reject pulse is produced in the reject circuit 804 in timed relation with the advancement of the piece of dough weighing at least the prescribed weight. Accordingly, at the time the piece of dough weighing at least the prescribed weight is discharged onto the reversible conveyor E, the normally operated clutch 390 (FIG. 9) is engaged.

When the cycle control relay 1090 is energized, contacts 1091 and 1092 open. The opening of contacts 1092 releases the relay 870 (FIG. 6) through its locking circuit. The opening of contacts 1091 deenergizes relay 1090 and further opens the activating circuit for the reject control circuit 804. When relay 870 is deenergized, contacts 873 open to remove the plate voltage from the thyratrons 1010–1013 to extinguish the same, and contacts 812 break to further open the activating circuit for the relay control circuit 804 and the energizing circuit for the cycle control relay 1090. Upon extinguishing the thyratrons 1010–1013, relays 1040, 1050, 1060 and 1070 are deenergized.

In case a piece of dough advancing across the weight checking apparatus C weighs less than the prescribed weight by an amount within a predetermined quantity, such as one-half ounce, the magnitude of the voltage signal transmitted by the amplifier 800 (FIG. 5) is sufficient to overcome the bias on the thyratron 1011 (FIG. 6) as well as the thyratrons 1012 and 1013. Consequently, the relay 1050, as well as the relays 1060 and 1070, operates. Upon operating relay 1050, contacts 1053 open and contacts 1051 close. The breaking of contacts 1053 opens the activating circuit for the reject control circuit 804

(FIG. 29), and the closing of contacts 1051 prepares an operating circuit for a relay 1150 (FIG. 6).

When the beam of light projected by the light source 131 (FIG. 5) is no longer interrupted by the piece of dough advancing across the check weighing apparatus C, the relay 860 is deenergized to open contacts 863 and to close contacts 864. The breaking of contacts 863 opens the operating circuit for the relay 870, which remains energized through its locking circuit. The closing of contacts 864 completes an operating circuit for a relay 1150 (FIG. 6) over the following path: positive side of the power supply 882 (FIG. 9), conductor 881, contacts 864 (FIG. 5), conductor 1096, contacts 871 (FIG. 6), conductor 1097, contacts 1091, conductor 1098, contacts 1043, contacts 1051, conductor 1154, relay 1150 and ground.

The closing of contacts 864 dos not activate the reject control circuit 804, since contacts 1053 of the relay 1050 are open. Accordingly, no reject pulse is produced in timed relation with the advancement of the piece of dough weighing less than the prescribed weight by an amount within a predetermined quantity, such as one-half ounce. Therefore, at the time such a piece of dough is discharged onto the reversible conveyor E, the normally operated clutch 390 (FIG. 9) is engaged.

When relay 1150 (FIG. 6) is energized, contacts 1151–1153 are closed. The closing of contacts 1151 completes a holding circuit for the relay 1150 over the following path: ground, relay 1150, contacts 1151, conductor 1159, contacts 1173, conductor 1178, conductor 881 and the positive side of the power supply 882. The closing of contacts 1153 completes a circuit for controlling the activation of the dough discharge control circuit 805 (FIG. 7) over the following path: contacts 1153, conductor 1156, dough discharge control circuit 805, conductor 1155, conductor 839 and back to contacts 1153. The closing of contacts 1152 completes an energizing circuit for the cycle control relay 1090 over the following path: positive side of the power supply 882 (FIG. 9), conductor 881, contacts 1152 (FIG. 6), conductor 1157, time delay network 1102, relay 1090 and ground.

Upon energization of the cycle control relay 1090, contacts 1091 and 1092 open. The opening of contacts 1092 releases the relay 870 (FIG. 6) through its holding circuit and further opens the activating circuit for the reject control circuit 804. The breaking of contacts 1091 opens the operating circuit for the relay 1150, which remains energized through its locking circuit. When relay 870 is deenergized, contacts 873 open to remove the plate voltage from the thyratrons 1010–1013 to extinguish the thyratrons 1011–1013 and contacts 872 break to further open the activating circuit for the reject control circuit 804. Upon the extinguishing of thyratrons 1011–1013, relays 1050, 1060 and 1070 are deenergized. The release of relay 1050 opens contacts 1051 to further open the operating circuit for the relay 1150.

The dough discharge control circuit 805 (FIG. 7) comprises a thyratron 1160 that has its plate 1161 connected to a source of alternating current (FIG. 9) through the conductor 838, a resistor 1162, a capacitor 1163 and the relay 1171 in parallel with the resistor 1162 and the capacitor 1163. The cathode 1164 of the thyratron 1160 is connected to the source of alternating current over the following path: the conductor 839, the conductor 1155, a resistor 1165 of a time delay network 1166, a resistor 1167 and the conductor 838.

The time delay network 1166 also includes a resistor 1167′, which connects the grid 1168 of the thyratron 1160 to a capacitor 1169 of the time delay network 1166. In parallel with the capacitor 1169 is a potentiometer of the time delay network 1166. The capacitor 1169 charges negatively over the following path: cathode 1164, grid 1168, resistor 1167′, capacitor 1169, resistor 1165 and back to the cathode 1164. The negative charge on the capacitor 1169 is sufficient to prevent the firing of thyratron 1160.

When the relay 1150 (FIG. 6) is operated to activate the dough discharge control circuit 805 (FIG. 7), contacts 1153 close to shunt out the resistor 1165 of the time delay network 1166, thereby shunting out the alternating current across the resistor 1165. As a result thereof, the capacitor 1169 is discharged through the potentiometer 1170. By adjusting the potentiometer 1170, the discharge time of the capacitor 1169 can be regulated. When the capacitor 1169 discharges sufficiently, the thyratron 1160 will fire.

Connected to the plate 1161 of the thyratron 1160 is a relay 1171 (FIG. 7), which is energized while the thyratron 1160 conducts. When the relay 1171 is energized, contacts 1172 close to energize a relay 1174 (FIG. 7) over the following path: power supply 882 (FIG. 9), conductor 881, conductor 1178, contacts 1172 (FIG. 7), relay 1174 and ground. The contacts 1173 open to release the relay 1150 (FIG. 6) by opening its locking circuit, and the contacts 1152 of the relay 1150 open to release the cycle control relay 1090. The contacts 1153 of the relay 1150 open to disconnect the activating circuit from the dough discharge control circuit 805 (FIG. 5).

The energization of the relay 1174 (FIG. 7) opens contacts 1177 and closes contacts 1175 and 1176. By closing contacts 1175, a holding circuit is completed for the relay 1174 over the following path: ground, relay 1174, contacts 1175, conductor 1179, microswitch 686, conductor 1178, conductor 881 and the positive side of the power supply 882. The opening of contacts 1177 causes the brake 681 (FIG. 9) of the dough correcting apparatus F to deenergize, which was energized over the following path: contacts 1177 (FIG. 7), conductor 1180, brake 681 (FIG. 9), conductor 1181, conductor 1182, conductor 999, power supply 998, resistor 1001, conductor 1000, conductor 1135 and back to contacts 1177. When the brake 681 is deenergized, it is released.

Upon closing contacts 1176 of the relay 1174 (FIG. 7), the clutch 680 (FIG. 9) of the dough correcting apparatus F is energized over the following path: contacts 1176 (FIG. 7), conductor 1183, clutch 680 (FIG. 9), conductor 1181, conductor 1182, conductor 999, power supply 998, resistor 1001, conductor 1000, conductor 1135 and back to the contacts 1176. When the clutch 680 is energized, it is engaged to start the operation of the dough correcting apparatus F, whereby the dough correcting apparatus F projects a measured quantity of dough, such as one-half ounce.

The potentiometer 1170 (FIG. 7) of the time delay network 1166 is adjusted to delay the operation of the thyratron 1169 and thereby delay the operation of the relays 1171, 1174 and the clutch 680 so that the time interval between the release of the relay 860 (FIG. 5) and the projection of the measured quantity of dough by the dough correcting apparatus F is equal to the time it takes for a piece of dough advancing beyond the beam of light projected across the weight checking apparatus C to be discharged from the conveyor D (FIG. 2) toward the reversible conveyor E. Thus, the dough correcting apparatus F is operated in timed relation with the advancement of the piece of dough weighing less than the prescribed weight by an amount not in excess of the predetermined quantity, whereby the measured quantity of dough, such as one-half ounce, that is projected by the dough correcting apparatus F is deposited onto the continuously advancing piece of dough as it is discharged from the transfer conveyor D.

The thyratron 1160 (FIG. 7) is extinguished after contacts 1153 of the relay 1150 (FIG. 6) are opened to enable the capacitor 1169 (FIG. 7) to once again charge to its negative potential and when the negative portion of the source of alternating current is impressed on its plate 1161. At the time the thyratron 1160 extinguishes, the relay 1171 is deenergized and contacts 1172 break to open the operating circuit for the relay 1174. The relay 1174 remains energized through its holding circuit until the microswitch 686 (FIG. 9) is opened. The microswitch 686 is opened just prior to the completion of the cycle of operation of the dough correcting apparatus F and remains open for a sufficient time duration to break the holding circuit of the relay 1174 to deenergize the same. At the end of the cycle of operation of the dough discharging apparatus F, the microswitch 686 is closed to prepare a holding circuit for the relay 1174.

When the relay 1174 is deenergized, contacts 1176 break to open the energizing circuit for the clutch 680 of the dough correcting apparatus F and contacts 1177 close to complete the energizing circuit for the brake 681 of the dough correcting apparatus F.

In case a piece of dough advancing across the weight checking apparatus C weighs less than the prescribed weight by an amount within a selected range, such as between one-half ounce and one ounce, the magnitude of the voltage signal transmitted by the amplifier 800 (FIG. 5) is sufficient to overcome the bias on the thyratron 1012 (FIG. 6), as well as the thyratron 1013. Consequently, the relay 1060, as well as relay 1070, operates. When relay 1060 is operated, contacts 1061 break to open the activating circuit for the reject control circuit 804 (FIG. 8). The operation of the relay 1070 prepares an opearting circuit for the relay 1190 (FIG. 6).

When the beam of light projected by the light source 131 (FIG. 5) is no longer interrupted by the piece of dough advancing across the weight checking apparatus C, the relay 860 is deenergized to open contacts 863 and to close contacts 864. The breaking of contacts 863 opens the operating circuit for the relay 870 (FIG. 6), which remains energized through its locking circuit. The closing of contacts 864 completes an operating circuit for a relay 1190 (FIG. 6) over the following path: positive side of the power supply 882 (FIG. 9), conductor 881, contacts 864 (FIG. 5), conductor 1096, contacts 871, conductor 1097, contacts 1091, conductor 1098, contacts 1043 (FIG. 6), contacts 1053, contacts 1075, rectifier 1094, relay 1190 and ground.

The closing of contacts 864 of the relay 860 does not activate the reject control circuit 804, since contacts 1061 of the relay 1060 are open. Accordingly, no reject pulse is produced in timed relation with the advancement of the piece of dough weighing less than the prescribed weight within a selected range, such as between one-half ounce and one ounce. Therefore, at the time such a piece of dough is discharged onto the reversible conveyor E, the normally operated clutch 399 (FIG. 9) is engaged.

When relay 1190 (FIG. 6) is energized, contacts 1191–1193 are closed. The closing of contacts 1191 completes a lock circuit for the relay 1190 over the following path; ground, relay 1190, contacts 1191, conductor 1214, contacts 1213, conductor 1220, conductor 1178, conductor 881, and the positive side of power supply 882. The closing of contacts 1193 completes a circuit for controlling the activation of the dough discharge control circuit 806 (FIG. 7) over the following path: contacts 1193, conductor 1195, dough discharge control circuit 806, conductor 1196 and back to the contacts 1193. The closing of contacts 1192 completes an energizing circuit for the cycle control relay 1090 over the following path: power supply 882 (FIG. 9), conductor 881, contacts 1192, time delay network 1102, relay 1090 and ground.

Upon operating the cycle control relay 1090 (FIG. 6), contacts 1091 and 1092 open. The opening of contacts 1092 releases the relay 870 (FIG. 6) through its holding circuit and further opens the activating circuit for the reject control circuit 804. The breaking of contacts 1091 opens the operating circuit for the relay 1190, which remains energized through its locking circuit. When the relay 870 is deenergized, the contacts 873 open to remove the plate voltage from the thyratrans 1010–1013 to extinguish the thyratrons 1012 and 1013 and contacts 872 break to further open the activating circuit for the reject control circuit 804. Upon extinguishing the thyratrons 1012 and 1013, the relays 1060 and 1070 are deenergized. The release of relay 1070 opens contacts 1075 to further open the operating circuit for the relay 1190, which remains energized through its locking circuit.

The dough discharge control circuit 806 (FIG. 7) comprises a thyratron 1200 that has its plate 1201 connected to a source of alternating current (FIG. 9) through the conductor 838, a resistor 1202, a capacitor 1203, and the relay 1211 in parallel with the resistor 1202 and the capacitor 1203. The cathode 1204 of the thyraton 1200 is connected to the source of alternating current over the following path: the conductor 839, conductor 1196, a resistor 1205 of a time delay network 1206, a resistor 1207' and the conductor 838.

The time delay network 1206 (FIG. 7) also includes a resistor 1207, which connects the grid 1208 of the thyratron 1200 to a capacitor 1209 of the time delay network 1206. In parallel with the capactor 1209 is a potentiometer 1210 of the time delay network 1206. The capacitor 1209 charges negatively over a path from the cathode 1204, grid 1208, resistor 1207, capacitor 1209, resistor 1205 and back to the cathode 1204. The negative charge on the capacitor 1209 is sufficient to prevent the firing of the thyratron 1200.

When the relay 1190 operates to activate the dough discharge control circuit 806, contacts 1193 close to shunt out the resistor 1205 of the time delay network 1206, thereby shunting out the alternating current across the resistor 1205. As a result thereof, the capacitor 1209 discharges through the potentiometer 1210. By adjusting the potentiometer 1210, the discharge time of the capacitor 1209 can be regulated. When the capacitor 1209 discharges sufficiently, the thyratron 1200 will fire.

Connected to the plate 1201 of the thyratron 1200 is a relay 1211 (FIG. 7), which is energized while the thyratron 1200 conducts. When relay 1211 is energized, contacts 1212 close to energize a relay 1215 (FIG. 7) over the following path: positive side of the power supply 882 (FIG. 9), conductor 881, conductor 1178, conductor 1220, contacts 1212 (FIG. 7), relay 1215 and ground. The contacts 1213 break to open the locking circuit of the relay 1190 to deenergize the same. When relay 1190 is deenergized, contacts 1193 break to open the activating circuit for the dough discharge control circuit 806 (FIG. 7) and contacts 1192 open to release the cycle control relay 1090.

The energization of relay 1215 opens contacts 1218 and closes contacts 1216 and 1217. By closing contacts 1216 a holding circuit is completed for the relay 1215 over the following path: ground, relay 1215, contacts 1216, conductor 1221, microswitch 694 (FIG. 9), conductor 1222, conductor 1178, conductor 881 and the positive side of the power supply 882 (FIG. 9).

The opening of contacts 1218 causes the brake 691 (FIG. 9) of the dough discharging apparatus F to deenergize, which was energized over the following path: contacts 1218, conductor 1223, brake 691 (FIG. 9), conductor 1224, conductor 1181, conductor 1182, conductor 999, power supply 998, resistor 1001, conductor 1000, conductor 1135, and back to contacts 1218. When the brake 691 is deenergized, it is released.

Upon closing contacts 1217 of the relay 1215 (FIG. 7), the clutch 690 (FIG. 9) of the dough correcting apparatus F is energized over the following path: contacts 1217, conductor 1225, clutch 690, conductor 1224, conductor 1181, conductor 1182, conductor 999, power supply 998, resistor 1001, conductor 1000, conductor 1135 and back to contacts 1217. When the clutch 690 is energized, it is engaged to start the operation of the dough correcting apparatus F, whereby the dough correcting apparatus F projects a measured quantity of dough, such as one ounce.

The potentiometer 1210 (FIG. 7) of the time delay network 1206 is adjusted to delay the operation of the thyratron 1200 and thereby delay the operation of the relays 1211, 1215 and the clutch 690 so that the time interval between the release of the relay 860 (FIG. 5) and the projection of the measured quantity of dough by the dough correcting apparatus F is equal to the time it takes for a piece of dough advancing beyond the beam of light projected across the weight checking apparatus C to be discharged from the conveyor D (FIG. 2). Thus, the dough correcting apparatus F is operated in timed relation with the piece of dough weighing less than the prescribed weight by an amount within the selected range, whereby the measured quantity of dough, such as one ounce, that is projected by the dough correcting apparatus F is deposited onto the continuously advancing piece of dough as it is discharged from the conveyor D. The potentiometer 1210 is ganged to the potentiometer 1170 of the delay network 1166 so that the time delay adjustments for the dough discharge control circuits 805 and 806 can be made simultaneously.

The thyratron 1200 (FIG. 7) is extinguished after contact 1193 of the relay 1190 (FIG. 6) are opened to enable the capacitor 1209 (FIG. 7) to once again charge to the negative potential and when the negative portion of the source of alternating current is impressed on its plate 1201. At the time the thyratron 1200 extinguishes, the relay 1211 (FIG. 7) is deenergized and contacts 1212 break to open the operating circuit for the relay 1215. The relay 1215 remains energized through its holding circuit until the microswitch 694 (FIG. 9) is opened. The microswitch 694 is opened just prior to the completion of the cycle of operation of the dough correcting apparatus F and remains open for a sufficient time duration to break the holding circuit of the relay 1215 to deenergize the same. At the end of the cycle of operation of the dough correcting apparatus F, the microswitch 694 is closed to prepare a holding circuit for the relay 1215.

When the relay 1215 is deenergized, contacts 1217 break to open the energizing circuit for the clutch 690 of the dough correcting apparatus F and contacts 1218 close to complete the energizing circuit for the brake 691 of the dough correcting apparatus F.

If the piece of dough advancing across the weight checking apparatus C weighs less than the prescribed weight by an amount within another selected range, such as between one ounce and one and one-half ounces, the magnitude of the voltage signal transmitted by the amplifier 800 (FIG. 5) is sufficient to overcome the bias on the thyratron 1013 (FIG. 6). Consequently, the relay 1070 (FIG. 6) is operated. Upon operating the relay 1070, contacts 1074 break to open the activating circuit for the reject control circuit 804 (FIG. 8) and contacts 1071 and 1075 close to prepare operating circuits for the relays 1150 and 1190.

When the beam of light projected by the light source 131 (FIG. 5) is no longer interrupted by the piece of dough advancing across the weight checking apparatus C, the relay 860 (FIG. 5) is deenergized to open contacts 863 and to close contacts 864. The breaking of contacts 863 opens the operating circuit for the relay 870 (FIG. 6), which remains energized through its locking circuit. The closing of contacts 1075 completes an operating circuit for the relay 1190 (FIG. 6) over the following path: positive side of the power supply 882 (FIG. 9), conductor 881, contacts 864 (FIG. 5), conductor 1096, contacts 871, conductor 1097, contacts 1091, conductor 1098, contacts 1043, contacts 1053, contacts 1075, rectifier 1094, relay 1190 and to ground. The closing of contacts 1071 operates the relay 1150 (FIG. 6) over a similar path excepting that the path continues from the contacts 1053 through the contacts 1061 in the following manner: contacts 1071, conductor 1154, relay 1050 and ground.

The closing of contacts 864 does not activate the reject control circuit 804, since contacts 1074 of the relay 1070 are open. Accordingly, no reject pulse is produced in timed relation with the advancement of the piece of dough weighing less than the prescribed weight within the selected range, such as between one ounce and one and one-half ounces. Therefore, at the time such a piece of dough is discharged onto the reversible conveyor E, the normally operated clutch 390 (FIG. 9) is engaged.

Upon energizing the relay 1150, contacts 1151-1153 close and upon energizing the relay 1190, contacts 1191-1193 close. The closing of contacts 1151 and 1191 complete locking circuits for the relays 1150 and 1190, respectively, over paths previously described. The closing of contacts 1153 and 1193 activate the dough discharge control circuits in a manner previously described. The closing of contacts 1152 and 1192 operate the cycle control relay 1090 (FIG. 6) over the following path: ground, relay 1090, time delay circuit 1102, contacts 1192, contacts 1152, conductor 881 and the positive side of the power supply 882.

The operation of the cycle control relay 1090 causes contacts 1091 and 1092 to open. The opening of contacts 1092 releases the relay 870 (FIG. 6) through its holding circuit and further opens the activating circuit for the reject control circuit 804. The breaking of contacts 1091 opens the operating circuits for the relays 1150 and 1190, which remain energized through their previously described holding circuits.

When the relay 870 is deenergized, the contacts 873 open to remove the plate voltage from the thyratrons 1010-1013 to extinguish the thyratron 1013 and contacts 872 break to further open the activating circuit for the reject control circuit 804. Upon extinguishing the thyratron 1013, the relay 1070 is deenergized. The release of relay 1070 opens contacts 1071 and 1075 to further open the operating circuits for the relays 1150 and 1190.

The dough discharge control circuits 805 and 806 are activated simultaneously and operate in a manner previously described in detail. The operation of the dough discharge control circuits 805 and 806 delays the release of brakes 681 and 691 and delays the engagement of clutches 680 and 690 of the dough correcting apparatus F so that the time interval between the release of the relay 860 (FIG. 5) and the projection of the measured quantities of dough by the dough correcting apparatus F is equal to the time it takes for a piece of dough advancing beyond the beam of light projected across the weight checking apparatus C to be discharged from the conveyor D (FIG. 2). Thus, the dough correcting apparatus F is operated in timed relation with the piece of dough weighing less than the prescribed weight by an amount within the other selected range, whereby the measured quantity of dough, such as one and one-half ounces, that is projected by the dough correcting apparatus F, is deposited onto the continuously advancing piece of dough as it is discharged from the transfer conveyor D.

When relays 1171 and 1211 of the dough discharge control circuits 805 and 806 are operated, contacts 1173 and 1213 break to open the locking circuits for the relays 1150 and 1190, respectively. The relays 1150 and 1190 release to disengage the cycle control relay 1090.

Although the function and operation of each component of the electronic control circuits H has been described in connection with its particular circuitry, the overall operation of the circuits for correcting the dough divider or discharging machine A as pieces of dough are advanced through the machine will be described. In the operation of the electronic control circuits employed in the weight checking and correcting apparatus of the present invention, the transducer 130 (FIG. 5) transmits voltage signals in succession that are respectively representative of the weight of pieces of dough advancing in succession across the weight checking apparatus C. Each piece of dough advancing across the weight checking apparatus C interrupts the beam of light projected by the light source 131 toward the phototube 132 just before maximum deflection of the scale of the weight checking apparatus C is attained due to the weight imposed thereon. During the time the light beam is interrupted, the relay 860 (FIG. 5) of the relay circuit 801 is operated. As a piece of dough on the weight checking apparatus C advances beyond the beam of light the relay 860 is deenergized.

The voltage signals that are representative of the weight of pieces of dough advancing across the weight checking apparatus C are amplified by the amplifier circuit 800 and are transmitted in succession over the conductor 825 to the divider control circuit 802 (FIG. 7) and to the weight classifying circuit 803 (FIG. 6).

The transfer relay 890 (FIG. 7 of the divider control circuit 802 operates in response to the operation of the relay 860 of the relay circuit 801. When the transfer relay 890 is deenergized, the capacitor 925 (FIG. 7) is charged to a predetermined negative potential. Upon energizing the transfer relay 890, the capacitor 925 discharges to charge the capacitor 918 (FIG. 7) in the cathode circuits of the detector 909 to a negative reference potential of a predetermined magnitude. The capacitor 918 is charged to the negative reference potential just prior to the time the detector 909 receives a voltage signal representative of the weight of the piece of dough advancing across the weight checking apparatus C. The detector 909 is biased by the biasing network 913 so that the detector 909 conducts in response to the peak portions of the incoming signals. When the detector 909 conducts, it reduces the negative potential on the capacitor 918 and may charge the capacitor 918 positively dependent upon the difference between the magnitude of the incoming signal and the biasing potential on the detector 909.

The biasing network 913 is adjusted so that the charge remaining on the capacitor 918 is zero when the detector 909 conducts in response to a voltage signal representative of the weight of a piece of dough of a desired weight. If the voltage signal is representative of the weight of a piece of dough weighing more than the desired weight, the charge remaining on the capacitor 918 will be positive. In case the voltage signal is representative of the weight of a piece of dough weighing less than the desired weight, the charge remaining on the capacitor 918 will be negative.

When the transfer relay 890 is deenergized, a voltage pulse from the charge remaining on the capacitor 918 is transmitted to the averaging network 935 FIG. 7). The voltage pulse is representative of the difference between the desired weight for pieces of dough produced by the dough divider and the weight of the piece of dough advancing across the weight checking apparatus C. The above operations occur each time a piece of dough is weighed by the check weighing apparatus C. Accordingly, the detector 909 converts the successive voltage signals transmitted by the amplifier 800 into a series of pulses respectively representative of the difference between the desired weight and the weight of pieces of dough advancing in succession across the weight checking apparatus C.

The series of pulses are received by the averaging network 935 of the divider control circuit 802, which has a relatively long time constant compared with the time duration between successive pulses. The averaging network 935 produces an average signal from the series of pulses and impresses the average signal onto the grid 940 of the differential detector 941 FIG. 7). It is to be observed that the average signal produced by the averaging network 935 is not the result of a finite series of pulses, but it is a continuous signal reflecting an average of a series of pulses that is continuously produced by the detector 909.

If the average signal produced by the averaging network 935 has a magnitude representative of the desired weight, the voltage applied to the grid of the differential detector 941 is equal to the reference voltage impressed on the grid 944 of the differential detector 941 by the biasing network 945. Hence, the polarized relay 960 will not operate.

In case an average signal produced by the averaging network 935 has a positive magnitude, which is representative of an average weight in excess of the desired weight, the voltage applied to the grid 940 of the differential detector 941 is more positive than the reference voltage applied to the grid 944 of the differential detector 941. Consequently, the polarized relay 960 operates to close contacts 961. The closing of contacts 961 energizes the divider control relay 970 (FIG. 7). Upon energizing the relay 970, an operating circuit for the divider control motor 51 is completed to rotate the drive shaft of the motor 51 in a direction to decrease the weight of pieces of dough formed within the dough divider A.

The relay 970, when energized, also completes a circuit to apply a fixed positive potential to the bias control network 978. The capacitor 947 of the biasing network 945 charges slowly toward the positive voltage of the bias network 978 and applies a gradually increased positive potential to the grid 944 of the differential detector 941 until the positive potential on the grid 944 is equal to the positive potential on the grid 940 of the differential detector 941. When the potential on the grid 944 is equal to the potential on the grid 940, the polarized relay 960 is deenergized and the contacts 961 break to release the relay 970. The relay 970 is deenergized to open the operating circuit to the divider control motor 51 and to remove the positive potential from the bias control network 978. The capacitor 947 of the biasing network 945 then discharges to the reference voltage, which is zero.

If any average signal produced by the averaging network 935 has a negative magnitude, which is representative of an average weight less than the desired weight for pieces of dough leaving the dough divider, the voltage applied to the grid 940 of the differential detector 941 is more negative than the reference voltage applied to the grid 944 of the differential detector 941 by the biasing network 945. This results in the energization of the polarized relay 960, which operates to close contacts 962. The closing of contacts 962 operates the divider control relay 990 (FIG. 7).

Upon operating the divider control relay 990, an operating circuit for the reversible motor 51 is completed so that its drive shaft rotates in a direction to increase the weight of pieces of dough formed within the dough divider A. The operation of the relay 990 also completes a circuit to apply a fixed negative potential to the bias control network 978. The capacitor 947 of the biasing network 945 charges slowly toward the negative voltage on the bias control network 978 and impresses a gradually more negative potential on the grid 944 of the differential detector 941 until the negative potential on the grid 944 is equal in magnitude to the negative potential on the grid 940 of the differential detector 941. When the potential on the grid 944 is equal to the potential on the grid 940, the polarized relay 960 is deenergized.

The deenergizing of the polarized relay 960 releases the divider control relay 990. When the divider control relay 990 is released, the operating circuit for the reversible motor 51 is opened and the negative potential is removed from the bias control network 978. The capacitor 947 of the biasing network 945 then discharges to the reference voltage, which is zero.

Hence, the differential detector 941 compares the polarity of the average signal with a reference voltage to determine the direction of rotation of the reversible motor 51 and compares the magnitude of the average signal with a gradually increasing reference voltage of a like polarity to determine the time duration for operating the reversible motor 51.

The above-described operations for compensating between the desired weight and an average weight is repeated until the pieces of dough advancing across the weight checking apparatus C are of the desired weight. When this occurs, the average signal applied to the grid 940 of the differential detector 941 is equal to the reference voltage applied to the grid 944 of the differential detector 941 by the biasing network 945.

Although the weight checking and correcting apparatus of the present invention has been described in connection with the processing of pieces of dough, it will be recognized that the apparatus of the present invention may be employed in connection with other plastic-like articles or articles classifiable by weight or other qualities.

It will be understood that modifications and variations of the embodiments of the invention disclosed herein may be resorted to without departing from the spirit of the invention and the scope of the appended claims.

Having thus described our invention, what we claim as new and desire to protect by Letters Patent is:

1. A control circuit for adjusting an article discharging machine in response to successive signals that are respectively representative of the weight of articles successively delivered from said machine, said control circuit comprising means responsive to said successive signals for producing a series of successive pulses respectively representative of the differences between a desired weight and the weight of the successively delivered articles, means responsive to said series of successive pulses for producing an average signal, a differential detector including a first and second electron tube arranged so that differences in grid potentials on said tubes produces corresponding differences in cathode potentials on said tubes, means connected to the grid of said first tube for impressing thereon a reference voltage, means connected to the grid of said second tube for impressing thereon said average signal, a biasing network connected to the grid of said first tube, means operatively responsive to a potential difference between the cathodes of said tubes for controlling the adjustment of said discharging machine and for connecting a source of potential to said biasing network, and means interconnecting said biasing network to said reference voltage means to impress on the grid of said first tube a gradually increasing potential until the potential impressed on the grid of said first tube is equal to the potential impressed on the grid of said second tube, thereby controlling the adjustment time duration of said discharging machine.

2. A control circuit for adjusting an article discharging machine in response to successive voltage signals that are respectively representative of the weight of articles successively delivered from said machine, said control circuit comprising a peak detector having an input circuit for receiving said successive voltage signals and having an output circuit, a capacitor in said output circuit charged by said peak detector during the conduction thereof, means independent of the conduction of said peak detector for recurrently charging said capacitor to a reference voltage, a biasing network connected to said input circuit for biasing said peak detector to cut-off at a predetermined potential whereby said peak detector conducts when the potential of a voltage signal overcomes said predetermined biasing potential, said predetermined biasing potential and said reference voltage being selected so that said capacitor is charged to a voltage value commensurate with the difference between a desired weight and the weight of an article as represented by the voltage signal causing said peak detector to conduct, and means responsive to successive charges on said capacitor for controlling the adjustment of said discharging machine.

3. Weight checking apparatus for adjusting an article discharging machine so that articles delivered from said machine are of a desired weight, said apparatus comprising a conveyor arranged to receive articles from said machine and to successively advance the articles along a path in spaced relation, a weighing device disposed adjacent said path for weighing the articles in succession, means responsive to said weighing device for transmitting successive voltage signals representative of the weight of the successively advancing articles, a peak detector having an input circuit for receiving said voltage signals and having an output circuit, a capacitor in said output circuit charged by said peak detector during the conduction thereof, means independent of the conduction of said peak detector for charging said capacitor to a reference voltage, a biasing network connected to said input circuit for biasing said peak detector to cut-off at a predetermined potential whereby said peak detector conducts when the potential of a voltage signal overcomes said biasing potential, said biasing potential and said reference voltage being selected so that said capacitor is charged during the conduction of said peak detector to a voltage value commensurate with the difference between the desired weight and the weight of an article as represented by the voltage signal causing said peak detector to conduct, means responsive to successive charges on said capacitor for controlling the adjustment of said discharging machine, and means responsive to the movement of the successively advancing articles for alternately connecting said capacitor to said means for charging said capacitor to a reference voltage and to said means for controlling the adjustment of said article discharging machine.

4. A control circuit for adjusting an article discharging machine in response to successive voltage signals that are respectively representative of the weight of articles successively delivered from said machine, said circuit comprising a peak detector having a grid circuit for receiving said successive voltage signals and a cathode circuit, a capacitor in said cathode circuit charged by said peak detector during the conduction thereof, means independent of the conduction of said peak detector for recurrently charging said capacitor to a reference voltage, a biasing network connected to said grid circuit for biasing said peak detector to cut-off at a predetermined potential whereby said peak detector conducts when the potential of a voltage signal overcomes said biasing potential, said biasing potential and said reference voltage being selected so that said capacitor is charged to a voltage value commensurate with the difference between a desired weight and the weight of an article as represented by the voltage signal causing said peak detector to conduct, and means responsive to successive charges remaining on said capacitor for controlling the adjustment of said discharging machine.

5. A control circuit for adjusting an article discharging machine in response to successive voltage signals that are respectively representative of the weight of articles successively delivered from said machine, said control circuit comprising a peak detector having an input circuit for receiving said successive voltage signals and having an output circuit, a capacitor in said output circuit charged by said peak detector during the conduction thereof, means independent of the conduction of said peak detector for recurrently charging said capacitor to a reference voltage, a biasing network connected to said input circuit for biasing said peak detector to cut-off at a predetermined potential whereby said peak detector conducts when the potential of a voltage signal overcomes said biasing potential, said biasing potential and said reference voltage being selected so that said capacitor is charged to a voltage value commensurate with the difference between a desired weight and the weight of an article as represented by the voltage signal causing said peak detector to conduct, a circuit responsive to successive charges remaining on said capacitor for producing an average signal, and means responsive to said average signal for controlling the adjustment of said discharging machine.

6. Weight checking apparatus for adjusting an article discharging machine so that articles delivered from said machine are of a desired weight, said apparatus comprising a conveyor arranged to receive articles from said machine and to successively advance the articles along a path in spaced relation, a weighing device disposed adjacent said path for weighing the articles in succession, means responsive to said weighing device for transmitting successive voltage signals representative of the weight of the successively advancing articles, a peak detector having an input circuit for receiving said voltage signals and having an output circuit, a capacitor in said output circuit charged by said peak detector during the conduction thereof, means independent of the conduction of said peak detector for charging said capacitor to a reference voltage, a biasing network connected to said input circuit for biasing said peak detector to cut-off at a predetermined potential whereby said peak detector conducts when the potential of a voltage signal overcomes said predetermined biasing potential, said predetermined biasing potential and said reference voltage being selected so that said capacitor is charged during the conduction of said peak detector to a voltage value commensurate with the difference between the desired weight and the weight of an article as represented by the voltage signal causing said peak detector to conduct, a circuit responsive to successive charges on said capacitor for producing an average signal, means responsive to the movement of the articles successively advancing along said path for alternately connecting said capacitor to said means for charging said capacitor to a reference voltage and to said means for producing the average signal, and means responsive to said average signal for controlling the adjustment of said discharging machine.

7. A control circuit for adjusting a product discharging machine in response to successive signals that are respectively representative of the weight of increments of the product successively delivered from said machine, said control circuit comprising means responsive to said successive individual weight signals for producing a series of successive pulses respectively, the polarity of which represent the direction of weight variation from a desired weight, and the magnitude of which represent the differences between the weight of the successively delivered product increments and the desired weight; means responsive to said series of successive pulses for producing an average weight signal, the polarity of which relative to said first reference voltage determines the direction of the adjustment; means for establishing a second reference voltage of the same polarity as that of said first reference voltage and which steadily increases in magnitude toward that of said average weight signal; means for comparing said average weight signal with said changing second reference voltage; and means responsive to said latter comparison for controlling the duration of the adjustment of said discharging machine.

8. A control circuit for adjusting an article discharging machine in response to successive voltage signals that are respectively representative of the weights of individual articles successively delivered from said machine, said control circuit comprising a peak detector having an input circuit for receiving said successive voltage signals and having an output circuit, a capacitor in said output circuit charged by said peak detector during the conduction thereof, means independent of the conduction of said peak detector for recurrently charging said capacitor to a reference voltage, a biasing network connected to said input circuit for biasing said peak detector to cut-off at a predetermined potential whereby said peak detector conducts when the potential of a voltage signal overcomes said predetermined biasing potential, said predetermined biasing potential and said reference voltage being selected so that said capacitor is charged to a voltage value commensurate with the difference between a desired weight and the weight of an article as represented by the voltage signal causing said peak detector to conduct, and means responsive to successive charges on said capacitor resulting from the successive weight signals of individual articles for producing a weight signal that represents the average weight of a successive series of articles, a differential detector for comparing said average weight signal with a reference voltage which gradually approaches the voltage and polarity of said average weight signal, and means for controlling the adjustment of the article discharging machine on the basis of said comparison.

References Cited in the file of this patent
UNITED STATES PATENTS

| | | |
|---|---|---|
| 2,322,218 | Baird | June 22, 1943 |
| 2,796,197 | Criddle | June 18, 1957 |
| 2,925,835 | Mojonnier et al. | Feb. 23, 1960 |